United States Patent
Abotabl et al.

(10) Patent No.: US 11,870,734 B2
(45) Date of Patent: Jan. 9, 2024

(54) DORMANT BANDWIDTH PART (BWP) CONFIGURATION FOR FULL-DUPLEX OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/370,706

(22) Filed: Jul. 8, 2021

(65) Prior Publication Data

US 2022/0014342 A1    Jan. 13, 2022

Related U.S. Application Data

(60) Provisional application No. 63/049,988, filed on Jul. 9, 2020.

(51) Int. Cl.
*H04L 5/00* (2006.01)
*H04L 5/14* (2006.01)
(Continued)

(52) U.S. Cl.
CPC .............. *H04L 5/0098* (2013.01); *H04L 5/14* (2013.01); *H04W 24/10* (2013.01); *H04W 72/0453* (2013.01); *H04W 72/23* (2023.01)

(58) Field of Classification Search
CPC ..... H04L 5/001; H04L 5/0048; H04L 5/0098; H04L 5/14; H04L 5/1423; H04W 24/08;
(Continued)

(56) References Cited

U.S. PATENT DOCUMENTS 9,674,727 B2 * 6/2017 Damnjanovic ....... H04L 1/0023
10,721,720 B2 * 7/2020 Damnjanovic ......... H04L 27/26
(Continued)

FOREIGN PATENT DOCUMENTS

CN         111083770 A      4/2020
CN         112534916 A  *   3/2021   ........ H04W 52/0216
(Continued)

OTHER PUBLICATIONS

International Search Report and Written Opinion—PCT/US2021/041027—ISA/EPO—dated Oct. 22, 2021.

*Primary Examiner* — Eric Nowlin
(74) *Attorney, Agent, or Firm* — Norton Rose Fulbright US LLP

(57) ABSTRACT

This disclosure provides systems, methods, and devices for wireless communication that support dormant bandwidth part (BWP) configurations that may be used for full-duplex operation. In a first aspect, a user equipment (UE) in a full-duplex mode may, in at least one symbol, receive a downlink signal in a dormant downlink BWP and transmit an uplink signal in an uplink BWP. In a second aspect, a dormant downlink BWP may be further configured into one of multiple possible resource bandwidths (RBWs), which may include at least one dormant RBW. Each of the multiple RBWs that may be configured in the dormant BWP may be associated with a size and location as well as a set of one or more operational constraints. In a third aspect, a dormant downlink BWP may be further configured into one of multiple possible RBWs, which may include a downlink dormant RBW and an uplink dormant RBW.

30 Claims, 13 Drawing Sheets

(51) Int. Cl.
*H04W 72/0453* (2023.01)
*H04W 24/10* (2009.01)
*H04W 72/23* (2023.01)

(58) Field of Classification Search
CPC .. H04W 24/10; H04W 72/0453; H04W 72/23
See application file for complete search history.

(56) References Cited

U.S. PATENT DOCUMENTS

| | | | | |
|---|---|---|---|---|
| 10,813,137 | B2* | 10/2020 | Shih | H04W 72/23 |
| 11,115,162 | B2* | 9/2021 | Kim | H04W 72/044 |
| 11,374,723 | B2* | 6/2022 | Yi | H04W 24/10 |
| 11,375,518 | B2* | 6/2022 | Lin | H04L 5/0053 |
| 11,503,540 | B2* | 11/2022 | Jang | H04W 72/23 |
| 11,595,167 | B2* | 2/2023 | Yum | H04B 7/06 |
| 2015/0208269 | A1* | 7/2015 | Damnjanovic | H04L 5/0098 |
| | | | | 370/252 |
| 2015/0215929 | A1* | 7/2015 | Damnjanovic | H04W 72/21 |
| | | | | 370/241 |
| 2015/0373629 | A1* | 12/2015 | Zeng | H04W 48/16 |
| | | | | 370/328 |
| 2019/0182870 | A1* | 6/2019 | Shih | H04W 16/32 |
| 2020/0029316 | A1* | 1/2020 | Zhou | H04W 74/0833 |
| 2020/0145164 | A1 | 5/2020 | Cheng | |
| 2020/0229082 | A1* | 7/2020 | Jang | H04W 16/08 |
| 2020/0235903 | A1* | 7/2020 | Kim | H04L 1/1812 |
| 2020/0236692 | A1* | 7/2020 | Lin | H04W 72/0446 |
| 2020/0244410 | A1* | 7/2020 | Kim | H04W 72/542 |
| 2020/0305157 | A1* | 9/2020 | Kim | H04W 74/0833 |
| 2020/0313833 | A1* | 10/2020 | Yi | H04L 5/001 |
| 2020/0314747 | A1* | 10/2020 | Zhou | H04L 5/0053 |
| 2021/0029772 | A1* | 1/2021 | Islam | H04W 72/23 |
| 2021/0160126 | A1* | 5/2021 | Cirik | H04W 52/0241 |
| 2021/0195452 | A1* | 6/2021 | Harada | H04W 24/10 |
| 2021/0250156 | A1* | 8/2021 | Kim | H04W 52/0229 |
| 2021/0392651 | A1* | 12/2021 | Futaki | H04W 72/542 |
| 2021/0409174 | A1* | 12/2021 | Yum | H04B 17/24 |
| 2022/0006599 | A1* | 1/2022 | Wang | H04W 80/02 |
| 2022/0116878 | A1* | 4/2022 | Koskinen | H04W 76/28 |
| 2022/0116923 | A1* | 4/2022 | Kim | H04L 5/0098 |
| 2022/0167358 | A1* | 5/2022 | Cheng | H04W 72/542 |
| 2022/0200777 | A1* | 6/2022 | Lee | H04W 72/0453 |
| 2022/0225139 | A1* | 7/2022 | Seo | H04W 72/0453 |
| 2022/0225140 | A1* | 7/2022 | Seo | H04W 72/044 |
| 2022/0232568 | A1* | 7/2022 | Uchino | H04L 5/001 |
| 2022/0312417 | A1* | 9/2022 | Venkata | H04L 5/0098 |
| 2022/0312470 | A1* | 9/2022 | Seo | H04L 5/0055 |
| 2023/0079660 | A1* | 3/2023 | Fu | H04W 72/23 |
| | | | | 370/329 |

FOREIGN PATENT DOCUMENTS

| | | | | |
|---|---|---|---|---|
| CN | 112640536 A | * | 4/2021 | ......... H04L 41/0654 |
| CN | 114009085 A | * | 2/2022 | ........ H04W 72/0453 |
| EP | 3073694 A1 | | 9/2016 | |
| EP | 3993481 A1 | * | 5/2022 | ........ H04W 72/0453 |
| EP | 4096141 A1 | * | 11/2022 | ......... H04L 27/2601 |
| EP | 4181450 A1 | * | 5/2023 | ......... H04L 27/2601 |
| JP | 7219340 B2 | * | 2/2023 | ........ H04W 72/0453 |
| KR | 20210013351 A | * | 2/2021 | |
| KR | 102383385 B1 | * | 4/2022 | |
| WO | WO-2018194352 A1 | * | 10/2018 | ......... H04L 27/2601 |
| WO | WO-2020028792 A1 | * | 2/2020 | ......... H04L 41/0654 |
| WO | WO-2020034440 A1 | | 2/2020 | |
| WO | WO-2020159227 A1 | * | 8/2020 | ............. H04L 5/001 |
| WO | WO-2020191548 A1 | * | 10/2020 | |
| WO | WO-2020261461 A1 | * | 12/2020 | ........ H04W 72/0453 |
| WO | WO-2022153179 A1 | * | 7/2022 | |

\* cited by examiner

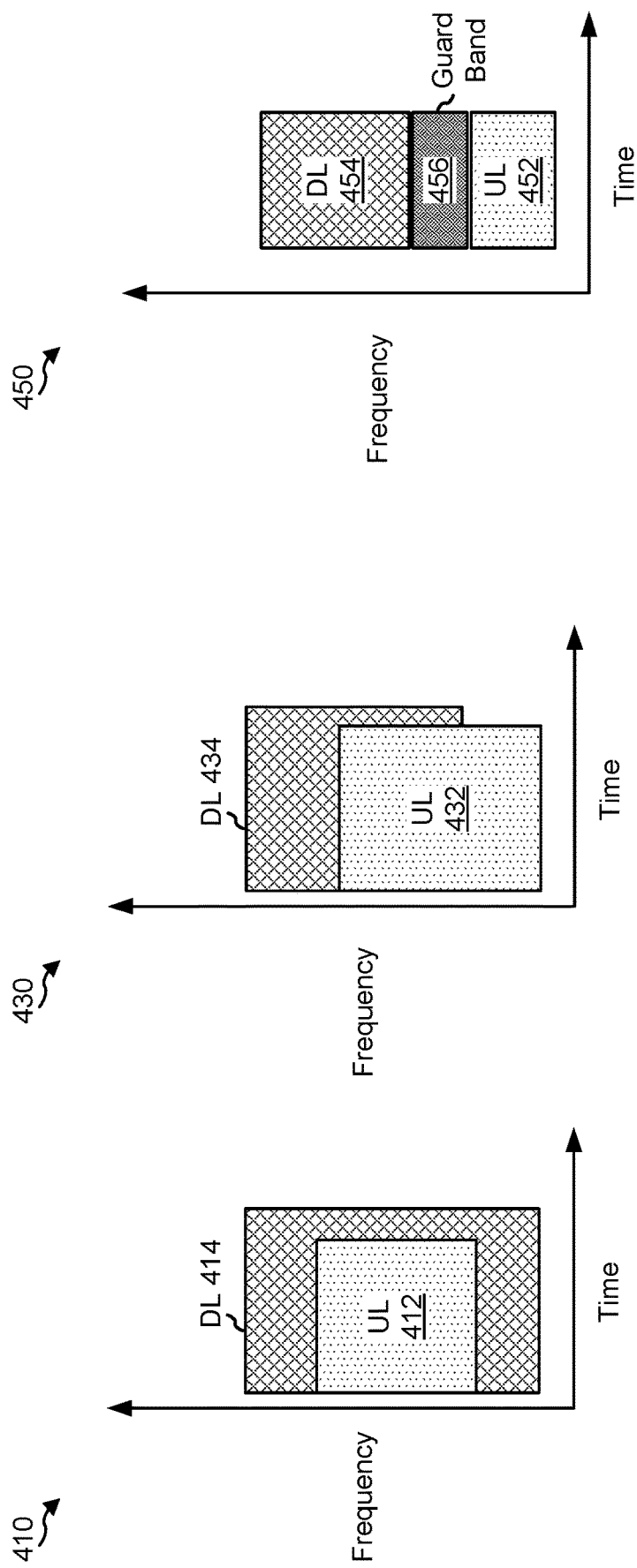

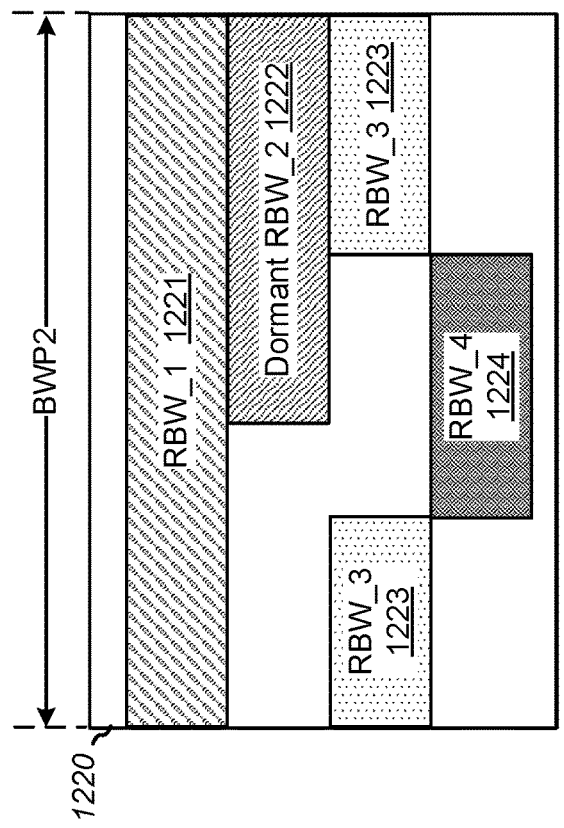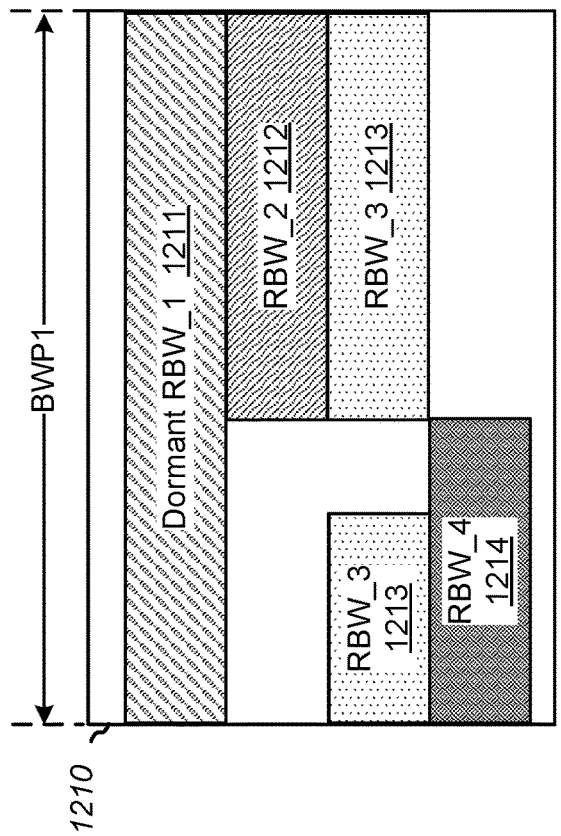
FIGURE 12

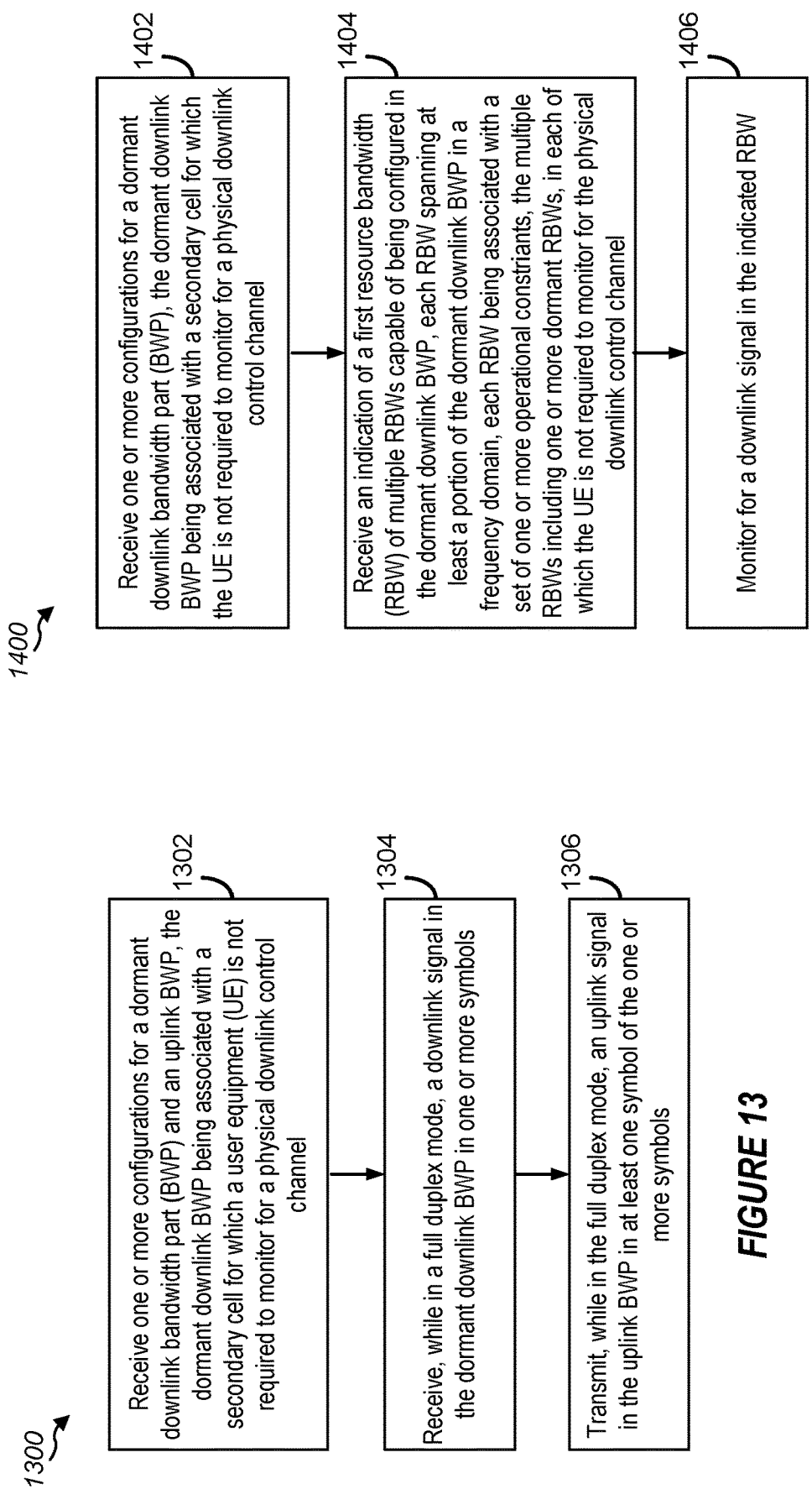

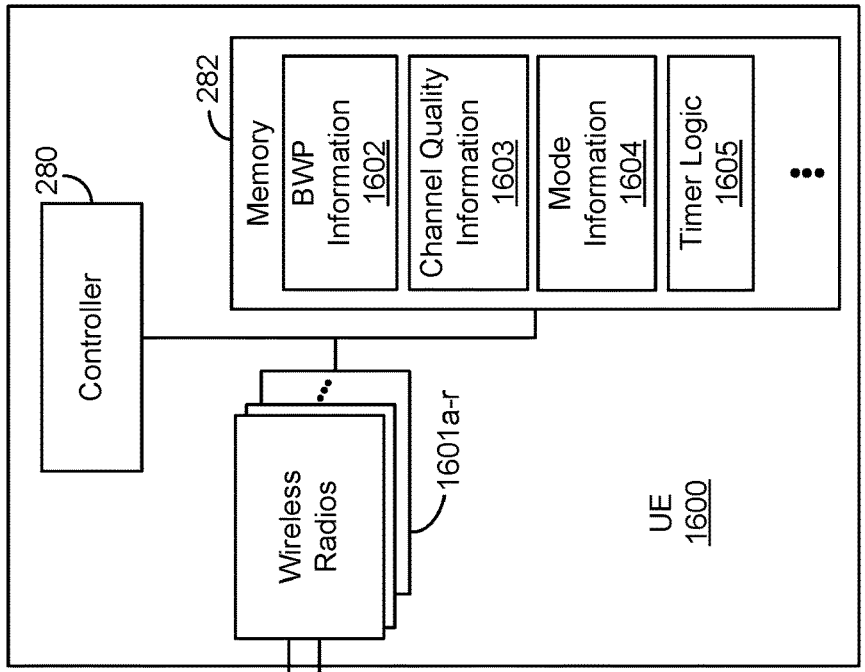
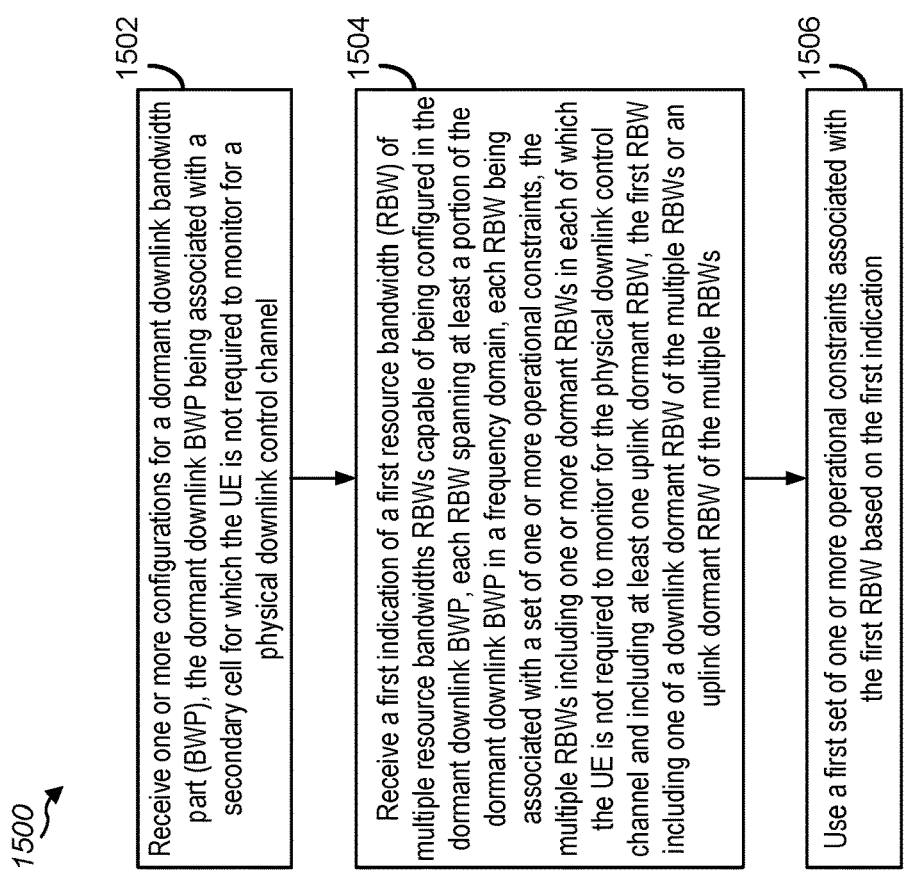
FIGURE 16
FIGURE 15

DORMANT BANDWIDTH PART (BWP) CONFIGURATION FOR FULL-DUPLEX OPERATION

CROSS-REFERENCE TO RELATED APPLICATIONS

This application claims the benefit of U.S. Provisional Patent Application No. 63/049,988, entitled, "DORMANT BANDWIDTH PART (BWP) CONFIGURATION FOR FULL-DUPLEX OPERATION," filed on Jul. 9, 2020, which is expressly incorporated by reference herein in its entirety.

TECHNICAL FIELD

Aspects of the present disclosure relate generally to wireless communication systems, and more particularly, to dormant bandwidth part (BWP) configurations that may be used for full-duplex operation.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Wireless communications systems may include one or more devices configured for full-duplex communication, such as sub-band full-duplex communication. In full-duplex communication, a first set of antennas of a device, such as a UE or a base station, are configured for downlink communication and a second set of the antennas are configured for uplink communication. Interference may result from transmissions from one or more other devices (such as one or more base stations or UEs), or from self-interference. For example, in the case that the device is a UE, an uplink communication by the UE may interfere with a downlink communication from a base station, or, in the case that the device is a base station, a downlink communication by the base station may interfere with an uplink communication from a UE. To mitigate self-interference, a UE may transmit or receive using less than an entirety of a bandwidth of a bandwidth part (BWP), such as an uplink (UL) BWP or a downlink (DL) BWP. For example, a BWP may be configured to include a resource bandwidth (RBW) that includes a sub-band of the UL BWP or the DL BWP, which enables an increase in an amount of separation between the downlink and uplink communications. By increasing the amount of separation between the downlink and uplink communications, an amount of leakage between the downlink and uplink communications may be reduced, thereby mitigating or reducing self-interference.

A base station of a wireless communication system may include or operate a primary cell (Pcell) that provides a primary access link for serving each of one or more UEs. The same or a different base station in the wireless communication system may include or operate a secondary cell (Scell) that may operate on a secondary frequency, which may be configured once a radio resource control (RRC) connection is established and which may be used to provide additional communication resources. The Scell may transition between a dormant state and a non-dormant state. While operating in the dormant state, the Scell may be associated with a dormant BWP within which various operations are restricted or subject to one or more constraints. For example, the Scell does not transmit a PDCCH or a PDSCH, and does not expect to receive a PUCCH or a PUSCH, in the dormant BWP. A UE is configured accordingly for the dormant BWP based on the restrictions or constraints. For example, the UE is not expected to receive a PDCCH or a PDSCH in a dormant BWP, and is not to transmit a PUCCH or a PUSCH in a dormant BWP. Such a configuration may enable the UE to realize power savings while the Scell is in the dormant state.

When a UE is configured for a dormant BWP, the UE is not able to determine self-interference for full duplex operation because the UE does not transmit any signals within the dormant BWP. However, when configured for the dormant BWP, the UE can still receive a downlink reference signal from the Scell in the dormant BWP and report a channel quality of the Scell to the Pcell. Additionally, when configured for the dormant BWP, the UE switches from the dormant BWP to a non-dormant BWP in order for the UE to transmit a PUCCH or a PUSCH, or receive a PDCCH or a PDSCH. However, the switching operation can require a significant duration of time due to the reconfiguration of one or more antennas of the UE. During such time that the UE is performing the switching operation, the UE may be unavailable for communication in the dormant BWP and non-dormant BWP with the base station of the Scell or one or more other devices of the wireless communication system, thereby resulting in system inefficiencies and delays.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving one or more configurations for a dormant downlink bandwidth part (BWP) and an uplink BWP. The dormant downlink BWP being associated with a secondary cell for which the UE is not required to monitor for a physical downlink control channel. The method further includes receiving, while in a full-duplex mode, a downlink signal in the dormant downlink BWP in one or more symbols. The method also includes transmitting, while in the full-duplex mode, an uplink signal in the uplink BWP in at least one symbol of the one or more symbols.

Another innovative aspect of the subject matter described in this disclosure can be implemented in a UE. The UE includes at least one processor and a memory coupled with the at least one processor and storing processor-readable instructions that, when executed by the at least one processor, is configured to receive one or more configurations for a dormant downlink BWP and an uplink BWP. The dormant downlink BWP being associated with a secondary cell for which the UE is not required to monitor for a physical downlink control channel. The processor-readable instructions further configured to receive, while in a full-duplex mode, a downlink signal in the dormant downlink BWP in one or more symbols, and initiate transmission, while in the full-duplex mode, an uplink signal in the uplink BWP in at least one symbol of the one or more symbols.

Another innovative aspect of the subject matter described in this disclosure can be implemented in an apparatus configured for wireless communication. The apparatus includes means for receiving one or more configurations for a dormant BWP and an uplink BWP. The dormant downlink BWP being associated with a secondary cell for which the UE is not required to monitor for a physical downlink control channel. The apparatus also includes means for receiving, while in a full-duplex mode, a downlink signal in the dormant downlink BWP in one or more symbols, and means for transmitting, while in the full-duplex mode, an uplink signal in the uplink BWP in at least one symbol of the one or more symbols.

Another innovative aspect of the subject matter described in this disclosure can be implemented in a non-transitory computer-readable medium storing instructions that, when executed by a processor, cause the processor to perform operations including receiving one or more configurations for a dormant downlink BWP and an uplink BWP. The dormant downlink BWP being associated with a secondary cell for which the UE is not required to monitor for a physical downlink control channel. The operations further include receiving, while in a full-duplex mode, a downlink signal in the dormant downlink BWP in one or more symbols, and initiating transmission, while in the full-duplex mode, of an uplink signal in the uplink BWP in at least one symbol of the one or more symbols.

Another innovative aspect of the subject matter described in this disclosure can be implemented as a method. The method includes receiving one or more configurations for a dormant downlink BWP. The dormant downlink BWP being associated with a secondary cell for which the UE is not required to monitor for a physical downlink control channel. The method further includes receiving an indication of a first resource bandwidth (RBW) of multiple RBWs capable of being configured in the dormant downlink BWP. Each RBW of the multiple RBWs spanning at least a portion of the dormant downlink BWP in a frequency domain. Each RBW being associated with a set of one or more operational constraints. The multiple RBWs include one or more dormant RBWs, in each of which the UE is not required to monitor for a physical downlink control channel. The method also includes monitoring for a downlink signal in the first RBW.

Another innovative aspect of the subject matter described in this disclosure can be implemented in a UE. The UE includes at least one processor and a memory coupled with the at least one processor and storing processor-readable instructions that, when executed by the at least one processor, is configured to receive one or more configurations for a dormant downlink BWP. The dormant downlink BWP being associated with a secondary cell for which the UE is not required to monitor for a physical downlink control channel. The processor-readable instructions further configured to receive an indication of a first RBW of multiple RBWs capable of being configured in the dormant downlink BWP. Each RBW of the multiple RBWs spanning at least a portion of the dormant downlink BWP in a frequency domain. Each RBW being associated with a set of one or more operational constraints. The multiple RBWs include one or more dormant RBWs, in each of which the UE is not required to monitor for a physical downlink control channel. The processor-readable instructions further configured to monitor for a downlink signal in the first RBW.

Another innovative aspect of the subject matter described in this disclosure can be implemented in an apparatus configured for wireless communication. The apparatus includes means receiving one or more configurations for a dormant downlink BWP. The dormant downlink BWP being associated with a secondary cell for which the UE is not required to monitor for a physical downlink control channel. The apparatus also includes means for receiving an indication of a first RBW of multiple RBWs capable of being configured in the dormant downlink BWP. Each RBW of the multiple RBWs spanning at least a portion of the dormant downlink BWP in a frequency domain. Each RBW being associated with a set of one or more operational constraints. The multiple RBWs include one or more dormant RBWs, in each of which the UE is not required to monitor for a physical downlink control channel. The apparatus further includes means for monitoring for a downlink signal in the first RBW.

Another innovative aspect of the subject matter described in this disclosure can be implemented in a non-transitory computer-readable medium storing instructions that, when executed by a processor, cause the processor to perform operations including receiving one or more configurations for a dormant downlink BWP. The dormant downlink BWP being associated with a secondary cell for which the UE is not required to monitor for a physical downlink control channel. The operations further include receiving an indication of a first RBW of multiple RBWs capable of being configured in the dormant downlink BWP. Each RBW of the multiple RBWs spanning at least a portion of the dormant downlink BWP in a frequency domain. Each RBW being associated with a set of one or more operational constraints. The multiple RBWs include one or more dormant RBWs, in each of which the UE is not required to monitor for a physical downlink control channel. The operations also include monitoring for a downlink signal in the first RBW.

Another innovative aspect of the subject matter described in this disclosure can be implemented as a method. The method includes receiving one or more configurations for a dormant downlink BWP. The dormant downlink BWP being associated with a secondary cell for which the UE is not required to monitor for a physical downlink control channel. The method further includes receiving a first indication of a first RBW of multiple resource bandwidths RBWs capable of being configured in the dormant downlink BWP. Each RBW of the multiple RBWs spans at least a portion of the dormant downlink BWP in a frequency domain. Each RBW of the multiple RBWs is associated with a set of one or more operational constraints. The multiple RBWs including one or more dormant RBWs in each of which the UE is not required to monitor for the physical downlink control channel and including at least one uplink dormant RBW. The first RBW includes one of a downlink dormant RBW of the multiple RBWs or an uplink dormant RBW of the multiple RBWs. The method also includes performing one or more operations for the first RBW based on a first set of one or more operational constraints associated with the first RBW based on receiving the first indication.

Another innovative aspect of the subject matter described in this disclosure can be implemented in a UE. The UE includes at least one processor and a memory coupled with the at least one processor and storing processor-readable instructions that, when executed by the at least one processor, is configured to receive one or more configurations for a dormant downlink BWP. The dormant downlink BWP being associated with a secondary cell for which the UE is not required to monitor for a physical downlink control channel. The processor-readable instructions further configured to receive a first indication of a first RBW of multiple resource bandwidths RBWs capable of being configured in the dormant downlink BWP. Each RBW of the multiple RBWs spans at least a portion of the dormant downlink BWP in a frequency domain. Each RBW of the multiple RBWs is associated with a set of one or more operational constraints. The multiple RBWs including one or more dormant RBWs in each of which the UE is not required to monitor for the physical downlink control channel and including at least one uplink dormant RBW. The first RBW includes one of a downlink dormant RBW of the multiple RBWs or an uplink dormant RBW of the multiple RBWs. The processor-readable instructions further configured to perform one or more operations for the first RBW based on a first set of one or more operational constraints associated with the first RBW based on receiving the first indication.

Another innovative aspect of the subject matter described in this disclosure can be implemented in an apparatus configured for wireless communication. The apparatus includes means receiving one or more configurations for a dormant downlink BWP. The dormant downlink BWP being associated with a secondary cell for which the UE is not required to monitor for a physical downlink control channel. The apparatus also includes means for receiving a first indication of a first RBW of multiple resource bandwidths RBWs capable of being configured in the dormant downlink BWP. Each RBW of the multiple RBWs spans at least a portion of the dormant downlink BWP in a frequency domain. Each RBW of the multiple RBWs is associated with a set of one or more operational constraints. The multiple RBWs including one or more dormant RBWs in each of which the UE is not required to monitor for the physical downlink control channel and including at least one uplink dormant RBW. The first RBW includes one of a downlink dormant RBW of the multiple RBWs or an uplink dormant RBW of the multiple RBWs. The apparatus further includes means for performing one or more operations for the first RBW based on a first set of one or more operational constraints associated with the first RBW based on receiving the first indication.

Another innovative aspect of the subject matter described in this disclosure can be implemented in a non-transitory computer-readable medium storing instructions that, when executed by a processor, cause the processor to perform operations including receiving one or more configurations for a dormant downlink BWP. The dormant downlink BWP being associated with a secondary cell for which the UE is not required to monitor for a physical downlink control channel. The operations further include receiving a first indication of a first RBW of multiple resource bandwidths RBWs capable of being configured in the dormant downlink BWP. Each RBW of the multiple RBWs spans at least a portion of the dormant downlink BWP in a frequency domain. Each RBW of the multiple RBWs is associated with a set of one or more operational constraints. The multiple RBWs including one or more dormant RBWs in each of which the UE is not required to monitor for the physical downlink control channel and including at least one uplink dormant RBW. The first RBW includes one of a downlink dormant RBW of the multiple RBWs or an uplink dormant RBW of the multiple RBWs. The operations further include performing one or more operations for the first RBW based on a first set of one or more operational constraints associated with the first RBW based on receiving the first indication.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4A is a diagram illustrating examples of in-band full-duplex (IBFD) communications.

FIG. 4B is a diagram illustrating an example of sub-band full-duplex communications.

FIG. 12 is a block diagram illustrating an example of two downlink BWPs that may be used for downlink communications according to some aspects.

FIG. 13 is a flow diagram illustrating an example process that supports a dormant BWP configuration that may be used for full-duplex operation for downlink communications according to some aspects.

FIG. 14 is a flow diagram illustrating an example process that supports a dormant BWP configuration that may be used for full-duplex operation for downlink communications according to some aspects.

FIG. 15 is a flow diagram illustrating an example process that supports a dormant BWP configuration that may be used for full-duplex operation for one of downlink or uplink communications according to some aspects.

FIG. 16 is a block diagram of an example UE that supports a dormant BWP configuration that may be used for full-duplex operation for downlink communications according to some aspects.

Like reference numbers and designations in the various drawings indicate like elements.

DETAILED DESCRIPTION

Figure 1:
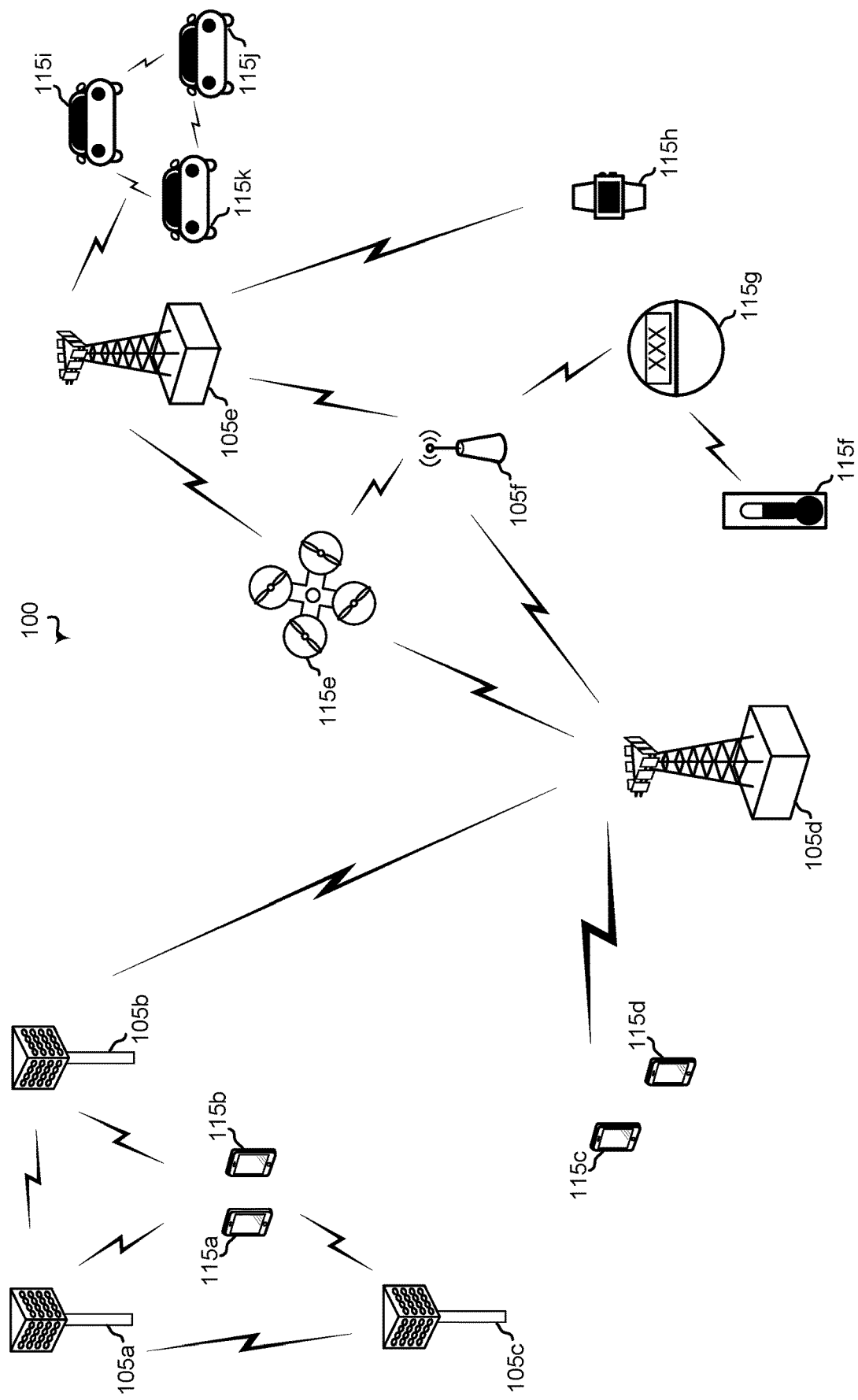
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media that support dormant downlink bandwidth part (BWP) configurations that may be used for full-duplex operation. A dormant downlink BWP is associated with a secondary cell for which a user equipment (UE) is not conventionally required to monitor for a physical downlink control channel (for example, a PDCCH). In various aspects, a UE in a full-duplex mode may receive a downlink signal from the secondary cell in a dormant downlink BWP in one or more symbols and transmit an uplink signal in an uplink BWP to the primary cell or the secondary cell in at least one same symbol of the one or more symbols, which enables the UE to monitor for, or measure to determine, self-interference.

In some implementations, a UE configured for a dormant downlink BWP may further be configured with one of multiple possible resource bandwidths (RBWs) that are capable of being configured in the dormant downlink BWP. Each RBW of the multiple RBWs may be associated with a particular bandwidth segment within the dormant BWP as well as with a set of one or more operational constraints. In some examples, two or more RBWs within the dormant BWP may be associated with different bandwidth sizes, different bandwidth locations or different sets of operational constraints. In such examples or other examples, two or more RBWs may share a bandwidth size or location but may be associated with different sets of operational constraints. In these or yet other examples, two or more RBWs may share a common set of operational constraints but may differ in either bandwidth size or location. For example, the multiple RBWs may include one or more dormant RBWs, in each of which the UE is not required to monitor for a PDCCH. The multiple RBWs may additionally include one or more non-dormant RBWs, in each of which the UE may be configured to monitor for a PDCCH despite their location within the dormant BWP. In some other examples, the multiple RBWs may include one or more downlink dormant RBWs, in each of which the UE is not required to monitor for a PDCCH, and at least one uplink dormant RBW in which the UE is configured to transmit an uplink reference signal, such as an SRS.

Particular implementations of the subject matter described in this disclosure can be implemented to realize one or more of the following potential advantages. By transmitting the uplink signal to the primary cell or the secondary cell in the uplink BWP concurrently with receiving the downlink signal from the secondary cell in the dormant downlink BWP, the UE may monitor or measure one or more signal characteristics to determine interference, such as an amount of self-interference. Based on the determined interference, the UE may initiate an action to mitigate the interference. Additionally, the UE can be configured with different RBWs within the dormant BWP depending on various channel conditions, operating modes, time periods or RRC criteria, each having different sizes, locations or associated operational constraints. By configuring the UE with different RBWs within the dormant BWP, system, device and resource flexibility and customization may be provided such that an operational efficiency of the UE or the wireless communication system is improved, or service delays and interruptions are reduced. Additionally, switching between different RBWs of a same dormant downlink BWP may be performed faster than switching between different BWPs, which may further provide flexibility and customization, improve the operational efficiency, or reduce service delays and interruptions.

Two or more wireless communications systems, also referred to as wireless communications networks, may be configured to provide or participate in authorized shared access between the two or more wireless communications systems. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
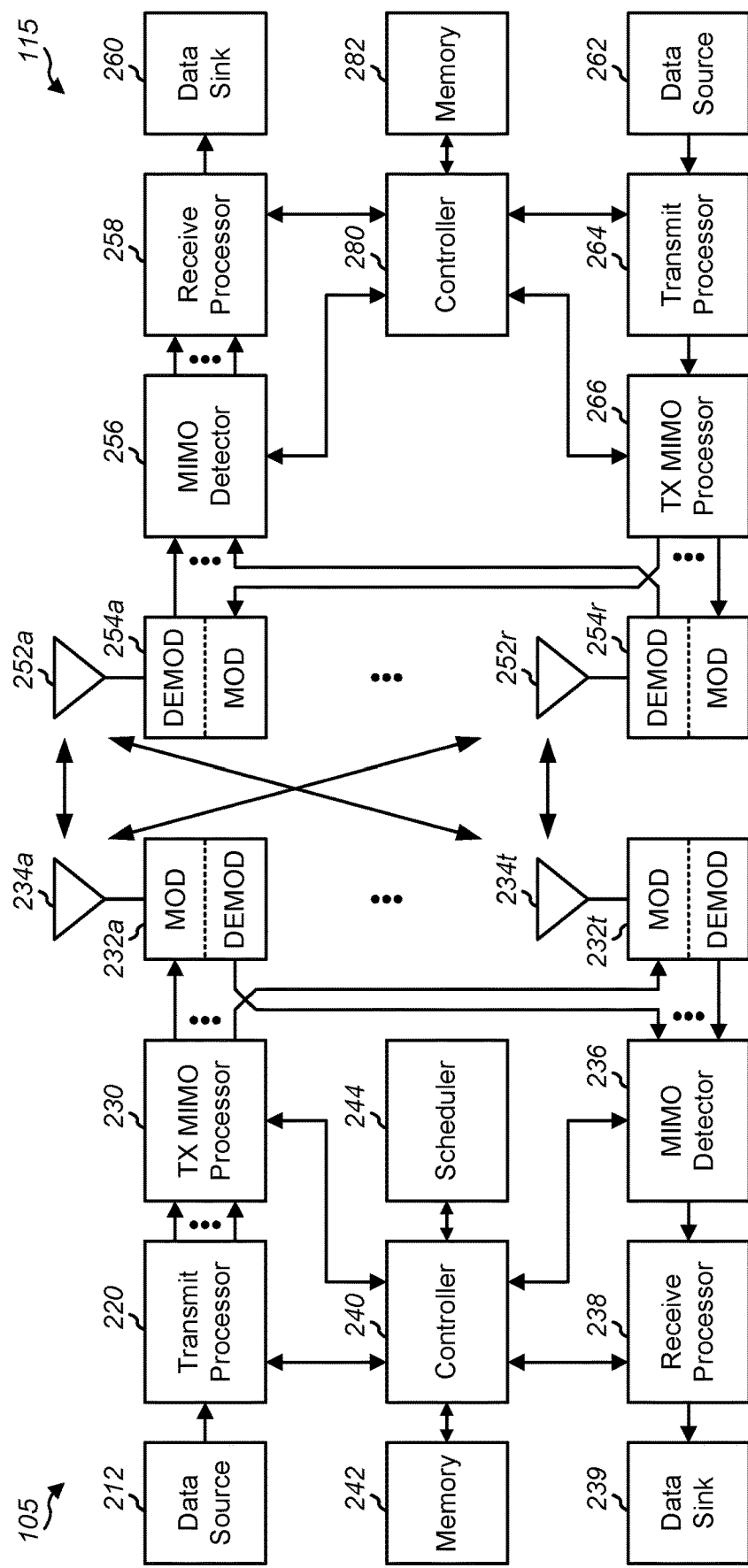
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 13 and 15, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3A:
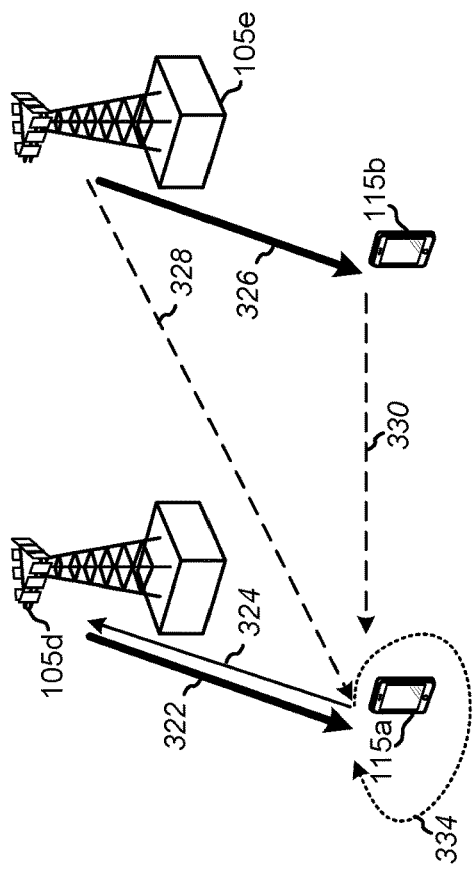
FIGS. 3A, 3B, and 3C are diagrams illustrating examples of wireless communication systems that support full-duplex communication modes according to some aspects.
Figure 3B:
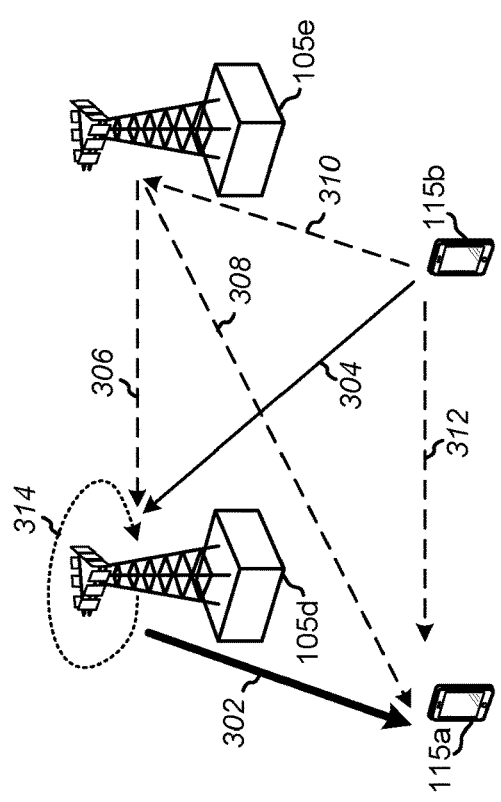
Figure 3C:
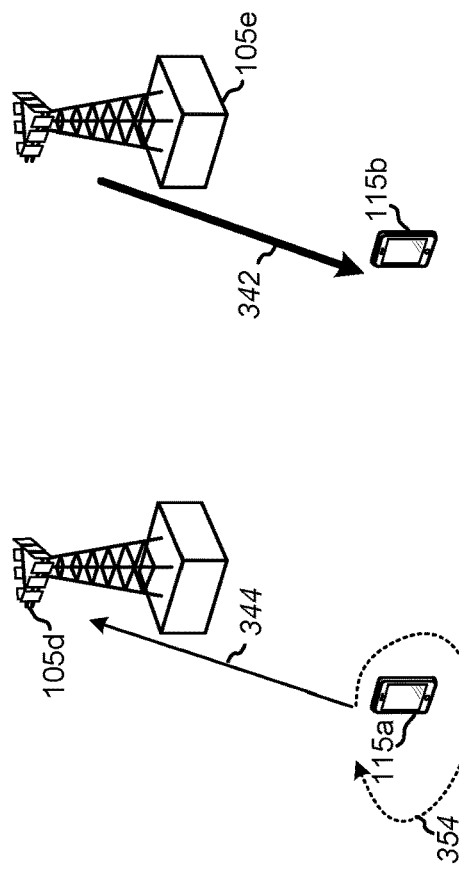

FIGS. 3A, 3B, and 3C are diagrams illustrating examples of wireless communication systems that support full-duplex communication modes according to some aspects. The wireless communication systems include the base stations 105d and 105e and the UEs 115a and 115b.

For full-duplex operation, a device typically divides resources, such as antennas of an antenna array, into uplink resources and downlink resources that may operate at the same time. For example, if the device is a base station, a first portion of the resources may be configured as downlink resources configured to transmit downlink signal and a second portion of the resources may be configured as uplink resources configured to receive uplink signals. In such a configuration, the transmission of the downlink signals may cause interference on the uplink signals that are received concurrently with transmission of the downlink signals. Other interference may be present with respect to downlink signals and uplink signals associated with the other base station or the UEs. Alternatively, if the device is a UE, a first portion of the resources may be configured as uplink resources and a second portion of the resources may be configured as downlink resources. In such a configuration, the transmission of the uplink signals may cause interference on the downlink signals that are received concurrently with transmission of the downlink signals.

In the example shown in FIG. 3A, the base station 115d is configured for full-duplex operation and the UE 115a is configured for half-duplex operation. The base station 115d transmits a downlink signal 302 to the UE 115a and receives an uplink signal 304 from the UE 115. The base station 314 generates self-interference from the downlink signal 302 to the uplink signal 304. Additionally, communications from the base station 105e cause interference 306 for the base station 105d and cause interference 308 for the UE 115a. Communications from the UE 115b cause interference 310 for the base station 105e and cause interference 312 for the UE 115a.

In the example shown in FIG. 3B, the base station 115d is configured for full-duplex operation and the UE 115a is configured for full-duplex operation. The UE 115 transmits an uplink signal 324 to the base station 105d and receives a downlink signal 322 from the base station 105d. The UE 115a generates self-interference 334 from the uplink signal 324 to the downlink signal 322. Additionally, the base station 105e transmits a downlink signal 326 to the UE 115b. Communications from the base station 105e may also cause interference 328 for the UE 115a. Communications from the UE 115b may also cause interference for the UE 115a.

In the example shown in FIG. 3C, the UE 115a is configured for full-duplex operation with multiple transmission points (Multi-TRP). The UE 115a transmits an uplink signal 344 to the base station 105d the UE 115b receives a downlink 342 from the base station 105e. The UE 115a experiences self-interference 354 based on the uplink signal 344 interfering with one or more downlink signals for the UE 115a. For example, the uplink signal 344 may cause interference for a PDCCH from the base station 105d or the base station 105e to the UE 115a.

FIG. 4A is a diagram illustrating examples of in-band full-duplex (IBFD) communications and FIG. 4B is a diagram illustrating an example of sub-band full-duplex communications. Referring to FIG. 4A, a first diagram 410 illustrates a first example of IBFD and a second diagram 430 illustrates a second example of IBFD. A device configured for IBFD operation may perform transmit and receive operations at the same time and in frequency resource. For example, a DL resource 414 and an UL resource 412 may share the same IBFD time/frequency resource, which may include a full overlap of the resources, or a partial overlap of the resources. In the example shown in first diagram 410, a full overlap of resources is shown in which an entirety of the UL resource 412 overlaps a portion of the DL resource 414 in frequency and time. In the example shown in the second diagram 430, the partial overlap of resources is shown in which a portion of the UL resource 432 overlaps a portion of the DL resource 434 in frequency and time.

FIG. 4B is a diagram 450 illustrating an example of sub-band full-duplex operation, also known as flexible duplex operation. In sub-band full-duplex operation, uplink signals and downlink signals are communicated at the same time but on the different frequency resource. As shown in FIG. 4B, the UL resource 452 overlaps the DL resource 454 in time. For example, the UL resource and the DL resource 454 may overlap for at least one symbol or at least one slot. Additionally, the DL resource 454 may be separated from a UL resource 452 in frequency domain by a guard band 456. Although the guard band 456 is present between the DL resource 454 and the UL resource 452, the guard band 456 may be small such that leakage still occurs between a downlink communication in the DL resource 454 and an uplink communication in the UL resource 452.

Figure 5:
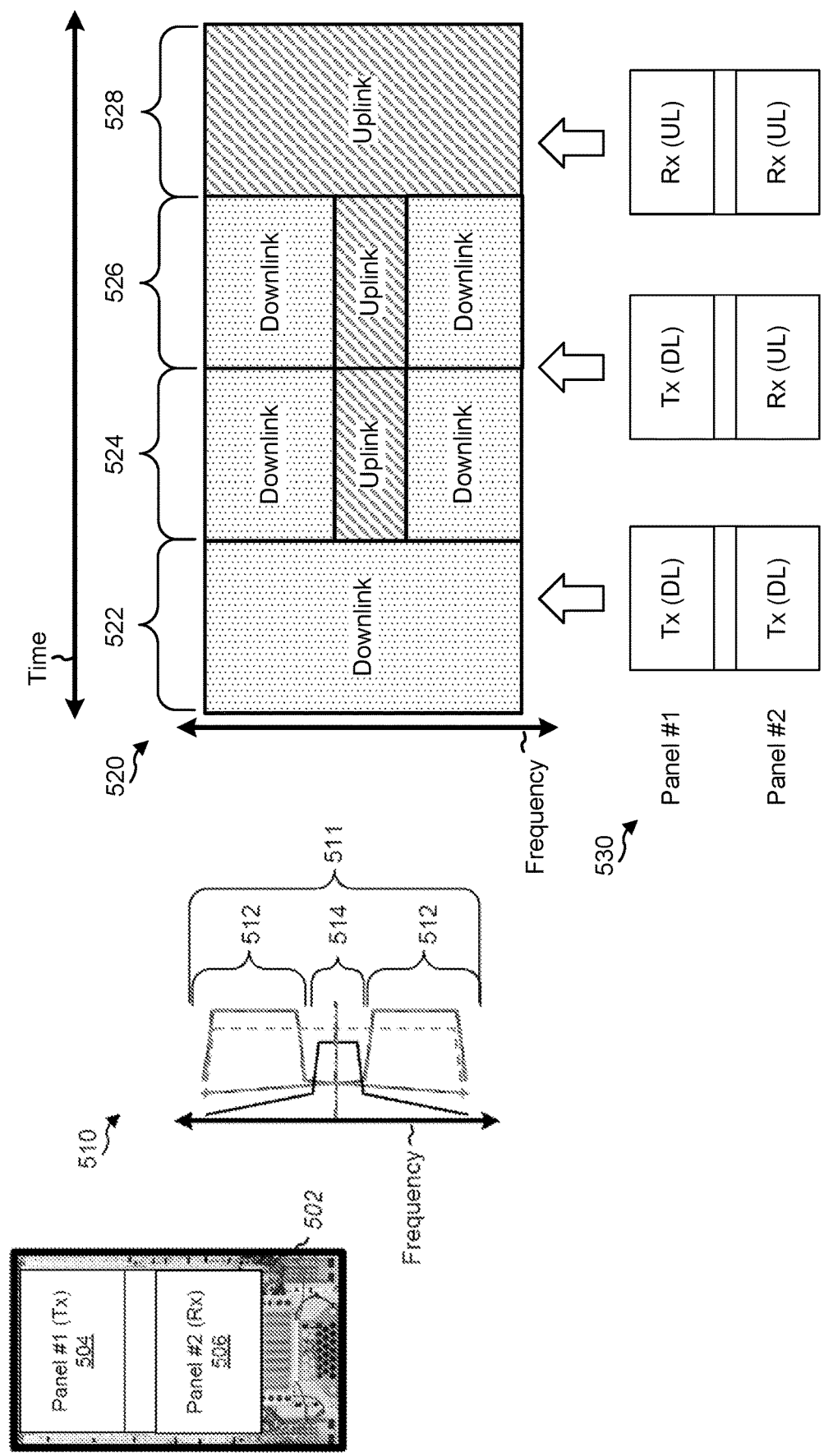
FIG. 5 is a diagram illustrating an example base station configured for sub-band full-duplex communication according to some aspects.

FIG. 5 is a diagram illustrating an example base station configured for sub-band full-duplex communication according to some aspects. The base station, such as the base station 105d, includes hardware 502 that is configurable for full-duplex operations. To illustrate, the hardware 502 may include two panels, such as a first panel 504 and a second panel 506 for simultaneous transmit and receive operations. For example, the first panel 504 may be configured for transmit operations and the second panel may be configured receive operations. A diagram 510 shows an example of simultaneous transmit and receive signals associated with full-duplex operations of the base station. The transmit and receive signals are present within a bandwidth 511 in which edge portions 512 (of the bandwidth 511) are associated with the downlink signal and a middle portion 514 (of the bandwidth 511) is associated with the uplink signal.

A diagram 520 shows an example of a representation of how full-duplex operations may be implemented by the base station in the frequency and time domains. As shown in the diagram 520, four slots 522, 524, 526, and 528 are shown in the time domain and allocated for full-duplex operations. To illustrate, a first slot 522 is allocated for downlink operations, a second slot 524 and a third slot 526 are each allocated such that a middle portion is allocated for uplink operations and sides portions are allocated for downlink operations, and a fourth slot 528 is allocated for uplink operations. Accordingly, the first slot 522, the second slot 524, and the third slot 526 can be used downlink signals and the second slot 524, the third slot 526, and the fourth slot 528 can be used for uplink signals.

A diagram 530 shows an example of configurations of the first panel 504 and the second panel 506 with respect to the four slots 522, 524, 526, and 528 of the diagram 520. During the first slot 522, the first panel 504 and the second panel 506 are configured for downlink operations. During the second slot 524 and the third slot 526, the first panel 504 is configured for downlink operation and second panel 506 is configured for uplink operation. During the fourth slot 528, the first panel 504 and the second panel 506 are configured for uplink operation.

Figure 6:
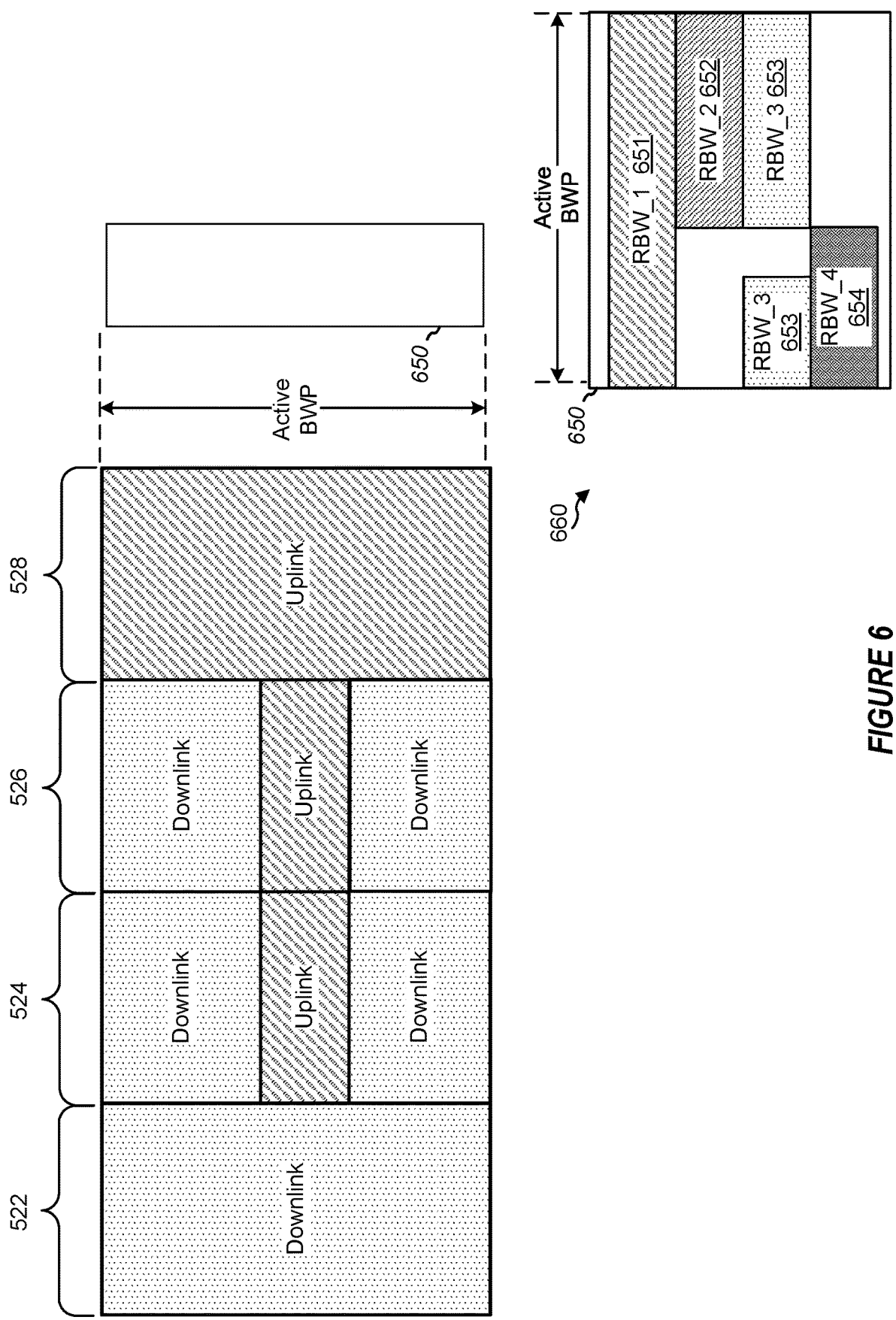
FIG. 6 is a block diagram illustrating an example of a bandwidth part (BWP) that may include one or more possible resource bandwidths (RBWs).

FIG. 6 is a block diagram illustrating an example of a BWP that may include one or more possible RBWs. In FIG. 6, the four slots of the diagram 520 of FIG. 5 are shown with respect to an active BWP 650.

The BWP 650 is associated with a continuous portion of a bandwidth for which a UE, such as the UE 115, can monitor downlink signals or uplink signals. For a UE, up to four BWPs can be configured for downlink operations and up to four BWPs can be configured for uplink operations. However, only one BWP may be active at a given time for uplink operations and only one BWP may be active at a given time for downlink operations. The UE is configured to switch between different BWPs, which can be time consuming, cause a delay or inefficiency in communication, and negatively impact a user experience. For example, the UE may switch between two different BWPs based on DCI, a bandwidth-inactivity timer (Bwp-InactivityTimer), RRC signaling, or a MAC entity. To illustrate, the DCI may indicate a specific BWP that is to be activated. Additionally, or alternatively, the bandwidth-inactivity timer may be used to switch between downlink BWPs a time period has elapsed during which no downlink communication is received from a serving cell. In some implementations, the bandwidth-inactivity timer may include or correspond to a serving cell configuration bandwidth-inactivity time (ServingCellConfig.bwp-InactivityTimer).

When using BWPs that are continuous in frequency and have large switching times, problems can occur in full-duplex such that uplink signals and downlink signals are not received or suffer from interference. Accordingly, the BWP 650 may be configured into one of multiple possible RBWs so that a UE can monitor a portion of the bandwidth of the BWP 650 and switch between RBWs, which has a shorter switching time than switching between BWPs.

A block diagram 660 shows an example of the BWP 650 configured into multiple possible RBWs. The BWP 650 spans a bandwidth, which may include or correspond to a set of one or more resource blocks (RBs). The BWP 650 is configured into multiple possible RBWs, such as a first RBW 651 (RBW_1), a second RBW 652 (RBW_2), a third RBW 653 (RBW_3), and a fourth RBW 654 (RBW_4). Each RBW of the multiple possible RBWs may be defined based on an initial RB of the RBW, a final RB of the RBW, a length of the RBW, or a combination thereof. It is noted that the length may wrap around from an end of the bandwidth to a beginning of the bandwidth. As an illustrative example, if the bandwidth of the BWP 650 includes twelve RBs (RB0-RB11), the first RBW 651 may have an initial RB of RB0, a final RB of RB11, and a length of 12; the second RBW 652 may have an initial RB of RB05 a final RB of RB11, and a length of 7; the third RBW 653 may have an initial RB of RB5, a final RB of RB2, and a length of 10; and the fourth RBW 654 may have an initial RB of RB0, a final RB of RB4, and a length of 5. Accordingly, as shown, each of the first RBW 651, the second RBW 652 and the fourth RBW 654 is continuous and the third RBW 653 is non-continuous. Additionally, or alternatively, a RBW may be defined as a bit map of RBs. For example, if a value of "1" indicates the RBW includes the RB and a value of "0" indicates the RBW does not include the RB, a bitmap of the first RBW 651 may be "111111111111", a bitmap of the second RBW 652 may be "000001111111", a bitmap of the third RBW 653 may be "111001111111", and a bit map of the fourth RBW 654 may be "111110000000".

Figure 7:
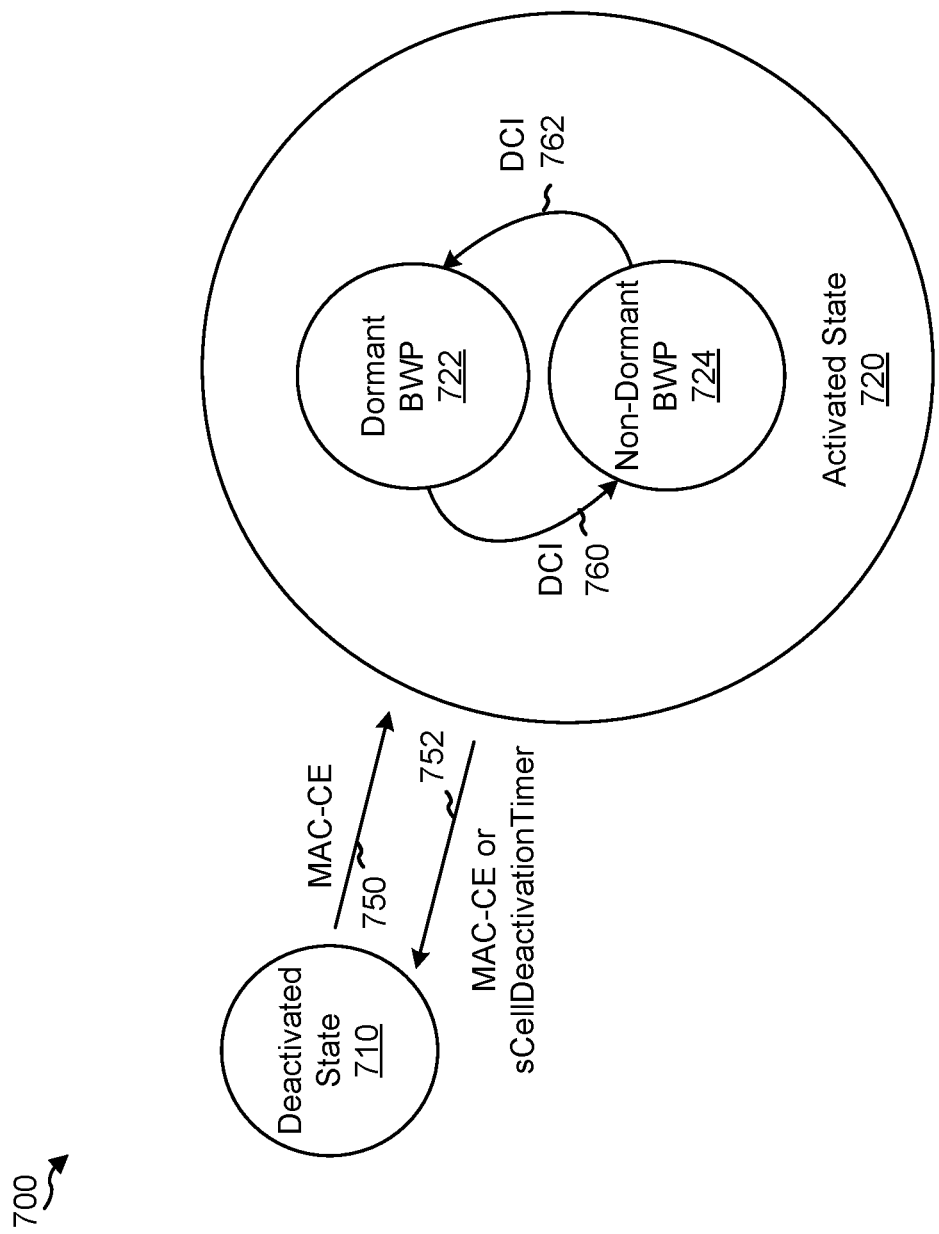
FIG. 7 is a state diagram illustrating example states of a device associated with operation in a dormant BWP.

FIG. 7 is a state diagram illustrating an example of states of a device associated with operation in a dormant BWP. For example, the device may be the base station 105 operating in a secondary cell. The device may be configurable in a deactivated state 710 or an activated state 720. The device may transition, at 750, from the deactivated state 710 to the activated state 720 based on a MAC-CE, such as a MAC-CE received from a Pcell or PScell. The device may transition, at 752, from the activated state 710 to the deactivated state 710 based on a MAC-CE, such as a MAC-CE received from a Pcell or PScell, or based on a timer, such as an sCellDeactivationTimer.

While in the activated state 720, the device may be in one of multiple sub-states or configurations. The multiple sub-states may include a dormant BWP 722 or a non-dormant BWP 724. During the non-dormant BWP 724, the device may perform normal operations without restrictions on one or more operations. Alternatively, the dormant BWP 722 may provide for power savings as compared to the non-dormant BWP 724. For example, during the dormant BWP 722, operations of the device may be restricted such that one or more signals are not transmitted or received, such as a PDCCH, a PDSCH, a PUCCH, or a PUSCH.

The device may be configured to transition to or from the BWP 722 based on one or more signals received from a primary cell or a primary secondary cell. For example, the one or more signals may include or be associated with DCI, such as a DCI format 0-1/1-1. To illustrate, the device may transition, at 760, from the dormant BWP 722 to the non-dormant BWP 724 based on a first DCI. The device may transition, at 762, from the non-dormant BWP 724 to the dormant BWP 722 based on a second DCI. In some implementations, the device may, based on a DCI, transition between the non-dormant BWP 724 and the dormant BWP 722 inside an active time. Additionally, or alternatively, the device may transition between the non-dormant BWP 724 and the dormant BWP 722 outside the active time based on a wake up signal (WUS).

When the device is in the dormant BWP 722, a UE, such as the UE 115, may also utilize a corresponding dormant BWP and can monitor a channel associated with the device. For example, the UE may monitor the channel to determine a quality of the secondary cell, and report the quality of the secondary cell to the primary cell to inform the primary cell of a status of the dormant secondary cell. In some implementations, while the UE is configured for the dormant BWP, the UE may be able to determine a channel quality associated with the secondary cell, but does not communicate (e.g., receive a PDCCH or a PDSCH, or transmit a PUCCH, or a PUSCH) with the secondary cell. If the primary cell wants the UE to utilize the secondary cell, the primary cell (or a primary second cell) instructs the UE to use a non-dormant BWP in which the UE can resume normal operations, such as monitoring for a PDCCH or a PDSCH, transmitting a PUCCH or a PUSCH, or a combination thereof. To illustrate, the UE may monitor for a PDCCH from the primary cell, and receive the PDCCH indicating that the UE should switch to a non-dormant BWP for the Scell.

The present disclosure provides systems, apparatus, methods, and computer-readable media that support dormant downlink BWP configurations that may be used for full-duplex operation. A dormant downlink BWP is associated with a secondary cell for which a UE is not conventionally required to monitor for a physical downlink control channel (for example, a PDCCH). In various aspects, a UE in a full-duplex mode may receive a downlink signal in a dormant downlink BWP in one or more symbols and transmit an uplink signal in an uplink BWP in at least one same symbol of the one or more symbols, which enables the UE to monitor for, or measure to determine, self-interference. In some implementations, a UE configured for a dormant downlink BWP may further be configured with one of multiple possible RBWs that are capable of being configured in the dormant downlink BWP. Each RBW of the multiple RBWs may be associated with a particular bandwidth within the dormant BWP as well as with a set of one or more operational constraints. In some examples, two or more RBWs within the dormant BWP may be associated with different bandwidth sizes, different bandwidth locations and different sets of operational constraints. In such examples or other examples, two or more RBWs may share a bandwidth size or location but may be associated with different sets of operational constraints. In these or yet other examples, two or more RBWs may share a common set of operational constraints but may differ in either bandwidth size or location. For example, the multiple RBWs may include one or more dormant RBWs, in each of which the UE is not required to monitor for a PDCCH. The multiple RBWs may additionally include one or more non-dormant RBWs, in each of which the UE may be configured to monitor for a PDCCH despite their location within the dormant BWP. In some other examples, the multiple RBWs may include one or more downlink dormant RBWs, in each of which the UE is not required to monitor for a PDCCH, and at least one uplink dormant RBW.

Particular implementations of the subject matter described in this disclosure can be implemented to realize one or more of the following potential advantages. In some aspects, the present disclosure provides configurations for a dormant downlink BWP in which a UE is able to receive a downlink signal concurrent with transmission of an uplink signal in an uplink BWP. By transmitting the uplink signal concurrently with receiving the downlink signal, the UE may monitor or measure one or more signal characteristics to determine interference, such as an amount of self-interference. Additionally, by configuring the UE with different RBWs within the dormant BWP depending on various channel conditions, operating modes, time periods or RRC criteria, each having different sizes, locations or associated operational constraints, various aspects may provide system, device and resource flexibility and customization, improve an operational efficiency of the UE or the wireless communication system, or reduce service delays and interruptions. Additionally, switching between different RBWs of a same dormant downlink BWP may be performed faster than switching between different BWPs, which may further provide flexibility and customization, improve the operational efficiency, or reduce service delays and interruptions.

Figure 8:
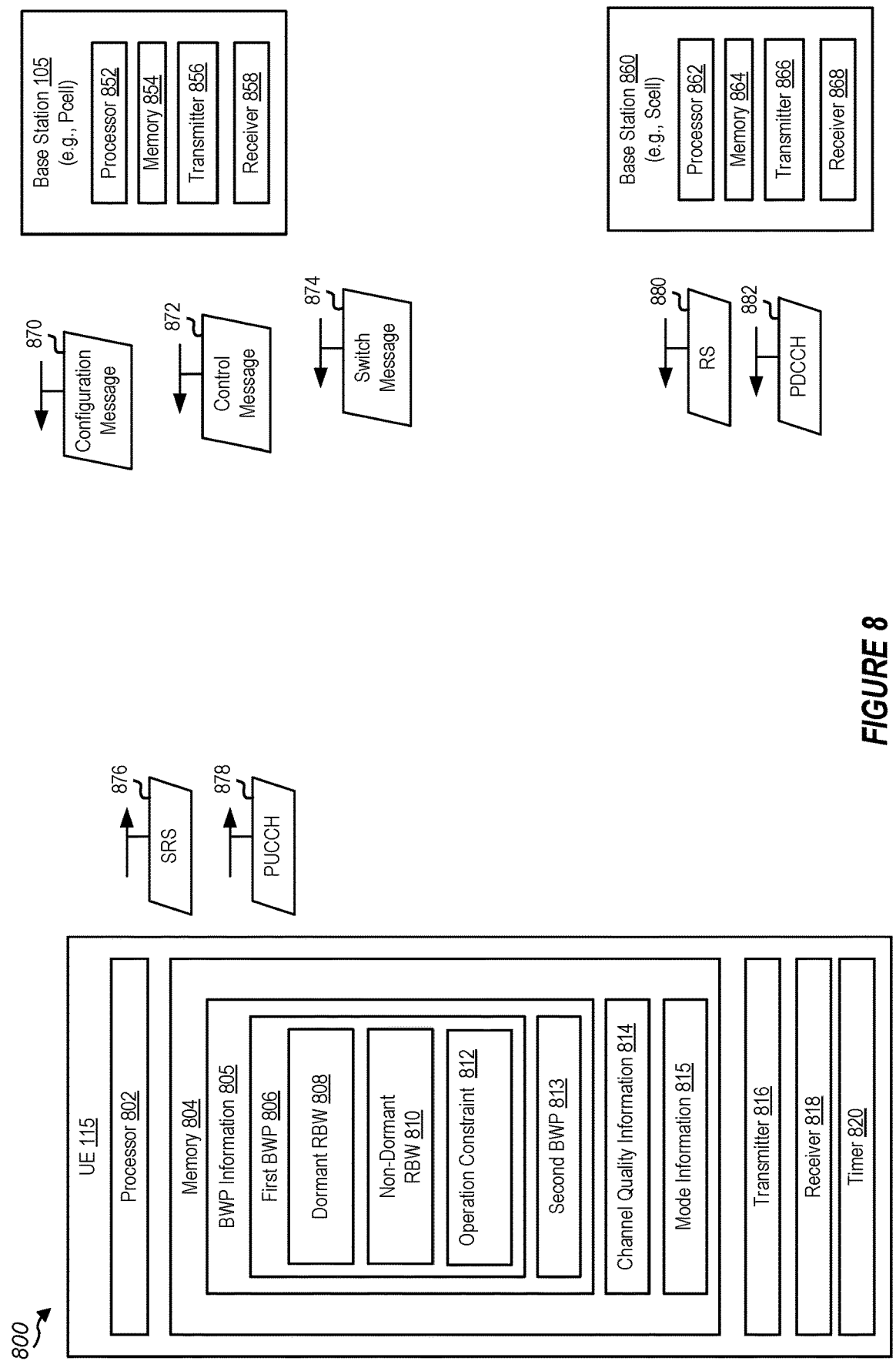
FIG. 8 is a block diagram illustrating an example wireless communication system that supports dormant BWP configurations that may be used for full-duplex operation according to some aspects.

FIG. 8 is a block diagram of an example wireless communications system 800 that supports dormant BWP configurations that may be used for full-duplex operation according to some aspects according to some aspects. In some examples, the wireless communications system 800 may implement aspects of the wireless network 100. The wireless communications system 800 includes the UE 115, the base station 105, and a base station 860. Although one UE 115 and two base stations 105, 860 are illustrated, in some other implementations, the wireless communications system 800 may generally include multiple UEs 115, and may include more than two base stations 105, 860.

The UE 115 can include a variety of components (such as structural, hardware components) used for carrying out one or more functions described herein. For example, these components can include one or more processors 802 (hereinafter referred to collectively as "the processor 802"), one or more memory devices 804 (hereinafter referred to collectively as "the memory 804"), one or more transmitters 816 (hereinafter referred to collectively as "the transmitter 816"), one or more receivers 818 (hereinafter referred to collectively as "the receiver 818"), and a timer 820. The processor 802 may be configured to execute instructions stored in the memory 804 to perform the operations described herein. In some implementations, the processor 802 includes or corresponds to one or more of the receive processor 258, the transmit processor 264, and the controller 280, and the memory 804 includes or corresponds to the memory 282.

The memory 804 includes BWP information 805, channel quality information 814, and mode information 815. The BWP information 805 may include one or more BWP configurations, one or more RBW configurations, or a combination thereof. For example, the one or more BWP configurations may include an UL BWP, a DL BWP, a non-dormant BWP, a dormant BWP, an active BWP, a non-active BWP, or a combination thereof, as illustrative, non-limiting examples. Additionally, or alternatively, the one or more RBW configurations may include a dormant RBW, a non-dormant RBW, a default dormant RBW, a default non-dormant RBW, a downlink dormant RBW, an uplink dormant RBW, a default downlink dormant RBW, a default uplink dormant RBW, or a combination thereof, as illustrative, non-limiting examples.

As shown, the BWP information includes a first BWP 806 and a second BWP 813. In some implementations the first BWP 806 is a dormant BWP and the second BWP 813 is a dormant BWP or a non-dormant BWP. The dormant BWP is associated with a secondary cell for which the UE 115 is not required to monitor for a physical downlink control channel, such as PDCCH 882. The first BWP 806 may include or indicate a dormant RBW 808, a non-dormant RBW 810, one or more operational constraints 812 (hereinafter referred to collectively as "the operational constraint 812"), or a combination thereof. The operational constraint 812 may defined an operation for the first BWP 806, such as an operation for the dormant RBW 808. The operational constraint 812 may receiving a downlink signal, transmitting an uplink signal, monitoring SCI-RS, transmitting a sounding reference signal, measuring self-interference of the UE 115, measuring cluster reflection, receiving a downlink reference signal, transmitting an uplink reference signal, preforming a measurement associated with full-duplex, receiving a downlink channel, transmitting an uplink channel, or a combination thereof, as illustrative, non-limiting examples.

The channel quality information 814 may include or indicate an amount of interference, such as self-interference of the UE 115 from an uplink to a downlink. The self-interference may include or correspond to the self-interference 334, 354. Additionally, or alternatively, the channel quality information 814 may include or indicate a downlink reference signal measurement. The mode information 815 includes settings or parameters of one or more modes, such as a half-duplex mode, a full-duplex mode, such as a IBFD mode or a sub-band full-duplex mode, or a combination thereof. Additionally, or alternatively, the channel quality information 814 may include or indicate RRM measurements or RLM measurements. RRM may be based on measurements of SSB or CSI-RS, and can be reported with metrics such as reference signal received power (RSRP), reference signal received quality (RSRQ), and signal-to-interference-noise-ratio (SINR). Similarly, for RLM, both SS block based RLM and CSI-RS based RLM may be supported.

The transmitter 816 is configured to transmit reference signals, control information and data to one or more other devices, and the receiver 818 is configured to receive references signals, synchronization signals, control information and data from one or more other devices. For example, the transmitter 816 may transmit signaling, control information and data to, and the receiver 818 may receive signaling, control information and data from, the base station 105. In some implementations, the transmitter 816 and the receiver 818 may be integrated in one or more transceivers. Additionally or alternatively, the transmitter 816 or the receiver 818 may include or correspond to one or more components of the UE 115 described with reference to FIG. 2. In some implementations, the transmitter 816 and receiver 818 may be coupled to an antenna array, and the transmitter 816, receiver 818, the antenna array, may be configurable based on the BWP information 805. The timer 820 is configured to track or determine one or more time periods.

The base station 105 may be associated with or operate in a Pcell or a PScell. The base station 105 can include a variety of components (such as structural, hardware components) used for carrying out one or more functions described herein. For example, these components can include one or more processors 852 (hereinafter referred to collectively as "the processor 852"), one or more memory devices 854 (hereinafter referred to collectively as "the memory 854"), one or more transmitters 856 (hereinafter referred to collectively as "the transmitter 856"), and one or more receivers 858 (hereinafter referred to collectively as "the receiver 858"). The processor 852 may be configured to execute instructions stored in the memory 854 to perform the operations described herein. In some implementations, the processor 852 includes or corresponds to one or more of the receive processor 238, the transmit processor 220, and the controller 240, and the memory 854 includes or corresponds to the memory 242.

The transmitter 856 is configured to transmit reference signals, synchronization signals, control information and data to one or more other devices, and the receiver 858 is configured to receive reference signals, control information and data from one or more other devices. For example, the transmitter 856 may transmit signaling, control information and data to, and the receiver 858 may receive signaling, control information and data from, the UE 115. In some implementations, the transmitter 856 and the receiver 858 may be integrated in one or more transceivers. Additionally or alternatively, the transmitter 856 or the receiver 858 may include or correspond to one or more components of base station 105 described with reference to FIG. 2.

The base station 860 be associated with or operate in an Scell. The base station 860 can include a variety of components (such as structural, hardware components) used for carrying out one or more functions described herein. For example, these components can include one or more processors 862 (hereinafter referred to collectively as "the processor 862"), one or more memory devices 864 (hereinafter referred to collectively as "the memory 864"), one or more transmitters 866 (hereinafter referred to collectively as "the transmitter 866"), and one or more receivers 868 (hereinafter referred to collectively as "the receiver 868"). The processor 862 may be configured to execute instructions stored in the memory 864 to perform the operations described herein. In some implementations, the processor 862 includes or corresponds to one or more of the receive processor 238, the transmit processor 220, and the controller 240, and the memory 864 includes or corresponds to the memory 242.

The transmitter 866 is configured to transmit reference signals, synchronization signals, control information and data to one or more other devices, and the receiver 868 is configured to receive reference signals, control information and data from one or more other devices. For example, the transmitter 866 may transmit signaling, control information and data to, and the receiver 868 may receive signaling, control information and data from, the UE 115. In some implementations, the transmitter 866 and the receiver 868 may be integrated in one or more transceivers. Additionally or alternatively, the transmitter 866 or the receiver 868 may include or correspond to one or more components of base station 105 described with reference to FIG. 2.

In some implementations, the wireless communications system 800 implements a 5G New Radio (NR) network. For example, the wireless communications system 800 may include multiple 5G-capable UEs 115 and multiple 5G-capable base stations 105, such as UEs and base stations configured to operate in accordance with a 5G NR network protocol such as that defined by the 3GPP.

In some implementations, the base station 860 is associated with a secondary cell operated in full-duplex, such as sub-band full-duplex in which uplink resources and downlink resources share time but are separated in frequency. The UE 115 may be configured for full-duplex operation concurrently with the base station 860 being in an activated state in a full-duplex mode. The UE 115 configured for a non-dormant BWP can support an uplink channel, a downlink channel, and transmit one or more signals, such as a sounding reference signal. The UE 115 configured for a dormant BWP, such as a dormant downlink BWP, may be configured to operate according to one or more operational constraints and may be restricted or prohibited from performing other operations as compared to the non-dormant BWP, such as a non-dormant downlink BWP. For example, the UE 115 configured for a dormant downlink BWP may not monitor for a PDCCH 882. However, the UE 115 configured for a dormant downlink BWP may receive a RS 880, such as a downlink RS. Additionally, the UE 115 may be configured for a non-dormant up-link BWP in which the UE 115 may send a reference signal, such as a SRS 876. The SRS 876, the RS 880, or both, may enable to UE 115 to determine an amount of interference, such as an amount of self-interference from the uplink to the downlink, or measure a channel quality for maintain RRM or RLM. To illustrate, the UE 115 may determine the self-interference based on the SRS 876, the RS 880, or a combination thereof. Additionally, or alternatively, the UE 115 may measure clutter reflection. In some implementations, the UE 115 may switch from full-duplex operation to a half-duplex mode operation. For example, the UE 115 may switch to the half-duplex operation based on a control message 872. To illustrate, the control message 872 may include DCI and the UE 115 may switch to the half-duplex operation based on the received DCI. The control message 872 may be received from a primary cell or primary secondary cell, such as from the base station 105 operating in the primary cell or the primary secondary cell. By switching to the half-duplex operation, the UE 115 may conserve power as compared to the full-duplex operation.

In some implementations, a BWP, such as the dormant downlink BWP, is configured with multiple possible RBWs. For example, one or more RBWs may be defined by the configuration message 870, such as an RRC message. A BWP, such as a dormant downlink BWP, with multiple possible RBWs may include or correspond to the BWP 650 of FIG. 6. Additional examples of a BWP including multiple possible RBWs are described further herein at least with reference to FIGS. 9-12. At least one RBW of the multiple possible RBWs may be a dormant RBW. A dormant RBW may be defined as a portion or an entirety of a bandwidth of a BWP in which the UE 115 may operate according to one or more operational constraint. The one or more operational constraints in a RBW may have the effect of providing one or more operational restrictions as compared to a non-dormant RBW. To illustrate, the one or more operational constraints may be associated with DL RS reception, full-duplex and self-interference related measurements, or DL channels reception, as illustrative, non-limiting examples. In some implementations, the multiple possible RBWs also may include a non-dormant resource BW. In some implementations, each RBW of the multiple possible RBWs corresponds to a respective set of one or more operational constraints, such as a set of one or more operations the UE 115 may perform, a set of one or more operations the UE 115 is prohibited from performing, or a combination thereof.

Figure 9:
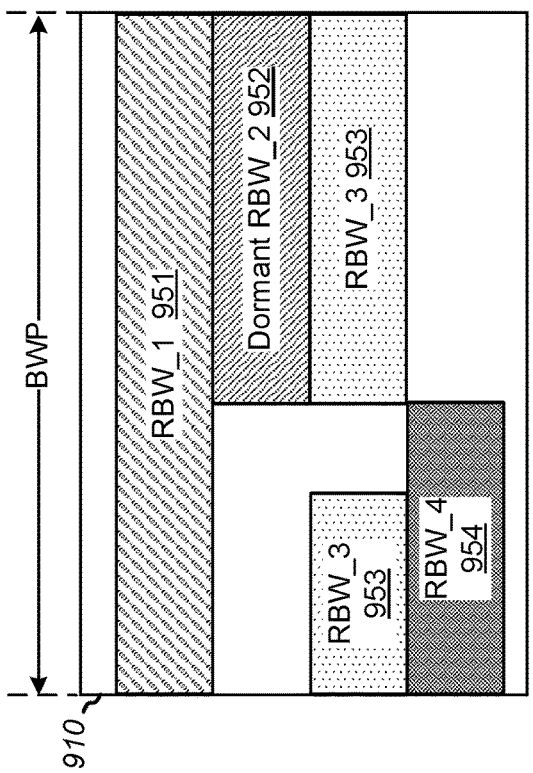
FIG. 9 is a block diagram illustrating an example of a dormant BWP that may be used for downlink communications according to some aspects.

FIG. 9 is an example of a dormant BWP 910 that may be used for downlink communications according to some aspects. The BWP 910, such as a dormant downlink BWP, may include or correspond to the first BWP 806. The BWP 910 spans a bandwidth and includes multiple possible RBWs, such as a first RBW 951 (RBW_1), a second RBW 952 (RBW_2), a third RBW 953 (RBW_3), and a fourth RBW 954 (RBW_4). As shown, the second RBW 952 is a dormant RBW and each of the first RBW 951, the third RBW 953, and the fourth RBW 954 in a non-dormant RBW.

The UE 115 may switch between use of the dormant RBW and use of the non-dormant based on a switch message 874 received from the base station 105, such as the base station 105 operating in a primary cell or a primary secondary cell. For example, the switch message 874 may include DCI and the UE 115 may switch between use of the dormant RBW and use of the non-dormant RBW based on the received DCI. In some implementations, the UE 115 may switch between use of different RBWs periodically or based on a time period that elapsed, such as a time period indicated in DCI or an RRC message received from the base station 105.

Figure 10:
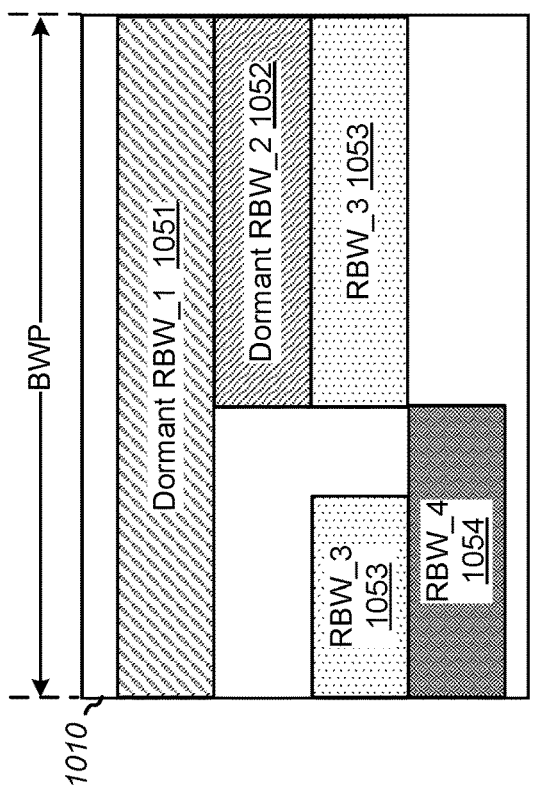
FIG. 10 is a block diagram illustrating an example of a dormant BWP that may be used for downlink communications according to some aspects.

In some implementations, a dormant downlink BWP may be configured with multiple possible dormant RBWs. To illustrate, FIG. 10 is an example of a dormant BWP 1010 that may be used for downlink communications according to some aspects. The BWP 1010, such as a dormant downlink BWP, may include or correspond to the first BWP 806. The BWP 1010 spans a bandwidth and includes multiple possible RBWs, such as a first RBW 1051 (RBW_1), a second RBW 1052 (RBW_2), a third RBW 1053 (RBW_3), and a fourth RBW 1054 (RBW_4). As shown, each of the first RBW 1051 and the second RBW 1052 is a dormant RBW and each of the third RBW 1053 and the fourth RBW 1054 in a non-dormant RBW.

In some implementations, each of the dormant RBWs may be configured with a set of one or more operational constraints, such as different operation restrictions. For example, if a dormant BWP includes three dormant RBW, such as a first RBW_1, a second RBW_2, and a three RBW_3, each of the three dormant RBWs may include different restrictions or different operational constraints. To illustrate, the first RBW_1 may be configured to monitor CSI-RS only, the second RBW may be configured to monitor CSI-RS and transmit SRS, and the third RBW_3 may be configured to measure self-interference or clutter reflection.

In some implementations, one or more of the multiple possible RBWs may be designated as a default RBW. For example, the configuration message 870, or bandwidth information included therein, may indicate one or more default RBWs. To illustrate, the multiple possible RBWs may include a first dormant RBW and a second dormant RBW, and one of the first and second dormant RBWs may be indicated as a default dormant RBW. The default dormant RBW may be selected by the UE 115 based on a wake up signal or based on a switch message if the switch message does not identify a BWP or a RBW. Additionally, the configuration message 870 may indicate an initial or default RBW to be used by the UE 115. For example, the configuration message 870 may indicate a default non-dormant RBW of the multiple possible RBWs. The default non-dormant RBW may be designated if the multiple RBWs include more than one non-dormant RBW and the UE 115 receives a switch message 874 that does not specific which non-dormant RBW to be switched to or used.

Figure 11:
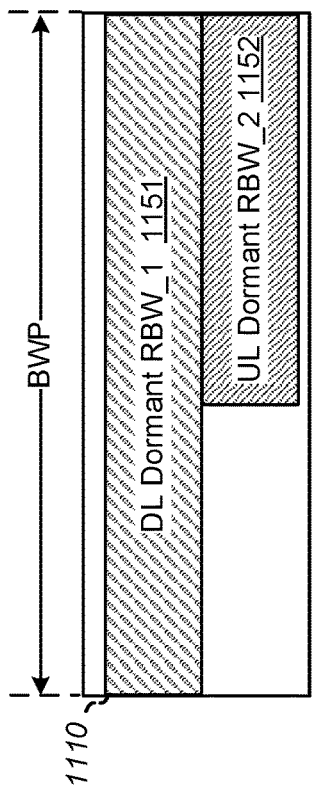
FIG. 11 is a block diagram illustrating an example of a dormant BWP that may be used for one of downlink or uplink communications according to some aspects.

In some implementations, one or more of the multiple possible RBWs may include a downlink dormant RBW, an uplink dormant RBW, or a combination thereof. The downlink dormant RBW may include or permit an operational constraint of receiving a downlink RS, such as RS 880, measuring RRM, measuring RLM, or a combination thereof. The uplink dormant RBW may include or permit an operational constraint of transmitting an uplink reference signal, such as the SRS 786, measuring interference, such as self-interference of the UE 115, or a combination thereof. To illustrate, FIG. 11 is an example of a dormant BWP 1110 that may be used for one of downlink or uplink communications according to some aspects. The BWP 1010, such as a dormant downlink BWP, may include or correspond to the first BWP 806. The BWP 1110 spans a bandwidth and includes multiple possible RBWs, such as a first RBW 1051 (RBW_1), such as a downlink dormant RBW, and a second RBW 1052 (RBW_2), such as an uplink dormant RBW.

In some implementations, the configuration message 870 may be associated with multiple BWPs that each include at least one dormant resource. For example, FIG. 12 is an example of two downlink BWPs that may be used for downlink communications according to some aspects is shown. The multiple BWPs include a first BWP 1210 and a second BWP 1220. The first BWP 1210 spans a first bandwidth and includes multiple possible RBWs, such as a first RBW 1211 (RBW_1), a second RBW 1212 (RBW_2), a third RBW 1213 (RBW_3), and a fourth RBW 1214 (RBW_4). As shown, the first RBW 1211 of the first BWP 1210 is a dormant RBW. The second BWP 12210 spans a second bandwidth and includes multiple possible RBWs, such as a first RBW 1221 (RBW_1), a second RBW 1222 (RBW_2), a third RBW 1223 (RBW_3), and a fourth RBW 1224 (RBW_4). As shown, the second RBW 1221 of the second BWP 1220 is a dormant RBW. The first bandwidth and the second bandwidth may be the same bandwidth or different bandwidths, such as distinct or partially overlapping bandwidths. If the UE 115 is configured for use of the second RBW 1212, such as a non-dormant RBW, of the first BWP 1210 as an active BWP, the UE 115 may receive a switch message, such as the switch message 874, via the second RBW 1212. Based on the switch message 874, the UE 115 may switch to use a dormant RBW within the first BWP 1210, such as the active BWP, or the UE 115 may switch to use of a dormant resource BW within another BWP, such as the second BWP 1220.

During operation of the wireless communications system 800, the base station 105 may transmit a configuration message 870, such as an RRC message, to the UE 115. The configuration message 870 may be associated with the dormant downlink BWP, such as the first BWP 806. For example, the configuration message 870 may include a configuration that defines the dormant downlink BWP. The dormant downlink BWP may be associated with one or more operational constraints including reception of a downlink signal.

The UE 115 receives the configuration message 870 and determines one or more active BWPs, such as the dormant downlink BWP, an uplink BWP, or a combination thereof. The UE 115 configures the UE 115 for the one or more active BWPs. In some implementations, the UE 115 is configured a full-duplex mode when the UE 115 configured for the dormant downlink BWP.

After configuring the UE 115 for the dormant downlink BWP, the UE 115 receives RS 880 in the dormant downlink BWP. Additionally, the UE 115 may transmit a sounding reference signal SRS 876 in another BWP, such as an uplink BWP. Based on the RS 880, the SRS 876, or both, the UE 115 may determine channel quality information 814.

In some implementations, before or after receiving the configuration message 870, the UE 115 may receive a control message 872 from the base station 105. The control message 872 may include DCI to cause the UE to set a mode of the UE, such as in a full-duplex mode or a half-duplex mode.

After transmitting the SRS 876 and receiving the RS 880, the UE 115 may receive one or more switch messages, such as a switch message 874. In some implementations, based on a first switch message, the UE 115 may identify a non-dormant downlink BWP, such as the second BWP 813. The UE 115 may configure the UE 115 for the non-dormant BWP. The UE 115 may receive PDCCH 882 in the non-dormant BWP, transmit the PUCCH 878 in the uplink BWP, or a combination thereof. In some implementations, based on a second switch message, the UE 115 may switch from use of a dormant RBW to use of another RBW, such as another RBW of the dormant downlink BWP or a RBW of another BWP, such as a RBW of another dormant downlink BWP or a RBW of a non-dormant downlink BWP.

In some implementations, the UE 115 may periodically switch from use of the dormant RBW to use of another RBW. Additionally, or alternatively, the UE 115 may switch from use of the dormant RBW to use of another RBW based on expiration of the timer 820. For example, the UE 115 may determine a duration of a time period based on DCI or an RRC message received from a primary cell or a primary secondary cell and set the timer 820 based on the determined duration of the time period.

As described with reference to FIG. 8, the present disclosure provides techniques for use of a dormant downlink BWP. For example, the UE 115 may be configured for the dormant downlink BWP associated with a secondary cell for which the UE 115 is not required to monitor for a physical downlink control channel. While configured in the dormant downlink BWP and in a full-duplex mode, the UE 115 may receive a downlink signal in the dormant downlink BWP in one or more symbols and an uplink signal in the uplink BWP in at least one symbol of the one or more symbols. Based on the downlink signal, the uplink signal, or a combination thereof, the UE 115 may determine interference, such as an amount of a self-interference. Additionally, the dormant downlink BWP may include multiple RBWs having at least one dormant RBW which is associated with a corresponding set of one or more operational constraints that the UE 115. The different operational constraints of different RBWs may provide system and device flexibility and customization. Additionally, switching the UE 115 between use of the different RBWs of a BWP may be performed faster than switching between use of different BWPs. Accordingly, the use of a dormant BWP, that includes multiple RBWs, may improving an operational efficiency of the UE and reduce service delays and interruptions.

FIG. 13 is a flow diagram illustrating an example process 1300 that supports a dormant BWP configuration that may be used for full-duplex operation for downlink communications according to some aspects. Operations of the process 1300 may be performed by a UE, such as the UE 115 described above with reference to FIGS. 1, 2, 3A, 3B, 3C, and 8, or the UE 1600 described with reference to FIG. 14. For example, example operations (also referred to as "blocks") of the process 1300 may enable the UE 400 to support a dormant BWP.

In block 1302, the UE receives one or more configurations for a dormant downlink BWP and an uplink BWP. The one or more configurations may include or correspond to the BWP information 805. The dormant downlink BWP may be associated with a secondary cell for which the UE is not required to monitor for a physical downlink control channel. The secondary cell may be associated with the base station 860. The dormant downlink BWP and the uplink BWP may include or correspond to the first BWP 806 or the second BWP 813. In some implementations, the uplink BWP is associated with the secondary cell.

In block 1304, the UE. receives, while in a full-duplex mode, a downlink signal in the dormant downlink BWP in one or more symbols. The downlink signal may include or correspond to the RS 880.

In block 1306, the UE transmits, while in the full-duplex mode, an uplink signal in the uplink BWP in at least one symbol of the one or more symbols. The uplink signal may include or correspond to the SRS 876.

In some implementations, the UE receives mode configuration information from a primary cell or a primary secondary cell. The mode configuration information may be received in a control message, such as the control message 872. The mode configuration information, may include or correspond to the mode information 815. Based on the mode configuration information, the UE be configured in the full-duplex mode, such as an in-band full-duplex mode or a sub-band full-duplex mode. The UE determines self-interference of the UE, such as an amount of interference caused by the uplink signal transmitted by the UE on the downlink signal received by the UE.

In some implementations, the UE is configured for the dormant downlink BWP based on the secondary cell being in a dormant state. The dormant state may include or correspond to the dormant BWP 722. The downlink signal may be received from the secondary cell while the secondary cell is in an in-band full-duplex mode or a sub-band full-duplex mode. The sub-band full-duplex mode may be associated with a configuration including one or more downlink resources and one or more uplink resources, the one or more downlink resources may be within a first bandwidth of a band and the one or more uplink resources may be within a second bandwidth of the band that is separated in a frequency domain from the first bandwidth. In some implementations, the first bandwidth and the second bandwidth are separated by a guard region. The in-band full-duplex mode may be associated with a configuration of one or more downlink resource and one or more uplink resources, the one or more downlink resources being within a first bandwidth of a band and the one or more uplink resources being within a second bandwidth of the band that at least partially overlaps the first bandwidth in the frequency domain.

In some implementations, UE receives the one or more configurations in a RRC message from a primary cell or a primary secondary cell. The primary or the second cell may be associated with the base station 105. The RRC message may include or correspond to the configuration message 870. The RRC message may indicate at least one of the one or more configurations. In some implementations, the one or more configurations define multiple resource bandwidths (RBWs) of the dormant downlink BWP. The multiple RBWs may include or correspond to the dormant RBW 808, the operational constraint 812, or a combination there. The multiple RBWs may include a first RBW that is a first dormant RBW and a second RBW that is a second dormant RBW or a non-dormant RBW.

In some implementations, after receiving the one or more configurations, the UE may receive one or more control messages including DCI from a primary cell or a primary secondary cell. The one or more control message may include or correspond to the control message 872. The UE may configure the UE for the dormant downlink BWP and the uplink BWP based on the one or more control messages.

In some implementations, after receiving the downlink signal and transmitting the uplink signal, the UE may receive a switching message including DCI. The switching message may include or correspond to the switch message 874. The UE may identify a non-dormant downlink BWP based on the switching message. In some implementations, the UE may switch the UE from using the dormant downlink BWP to using the non-dormant downlink BWP based on the switch message. Additionally, or alternatively, the UE may monitor, while in the full-duplex mode, for a physical downlink control channel or a physical downlink shared channel in the non-dormant downlink BWP from the secondary cell. In some implementations, after switching the UE to the non-dormant downlink BWP, the UE may transmit, while in the full-duplex mode, a physical uplink control channel or a physical uplink shared channel in the uplink BWP to the secondary cell while the secondary cell is in an activated, non-dormant state. For example, the physical uplink control channel may include or correspond to the PUCCH 878. The activated, non-dormant state may include or correspond to the non-dormant BWP 724.

FIG. 14 is a flow diagram illustrating an example process 1400 that supports a dormant BWP configuration that may be used for full-duplex operation for downlink communications according to some aspects. Operations of the process 1400 may be performed by a UE, such as the UE 115 described above with reference to FIGS. 1, 2, 3A, 3B, 3C, 8, or the UE 1600 described with reference to FIG. 16. For example, example operations (also referred to as "blocks") of the process 1400 may enable the UE 400 to support a dormant BWP.

In block 1402, the UE receives one or more configurations for a dormant BWP. The dormant BWP may include or correspond to the first BWP 806. The dormant downlink BWP is associated with a secondary cell for which the UE is not required to monitor for a physical downlink control channel. The secondary cell may be associated with the base station 860. In some implementations, the UE receives the one or more configurations receives a RRC message from a primary cell or a primary secondary cell. The RRC message may indicate the one or more configurations.

In block 1404, the UE receives an indication of a first RBW of multiple RBWs capable of being configured in the dormant downlink BWP. Each RBW may span at least a portion of the dormant downlink BWP in a frequency domain. In some implementations, the portion of the dormant downlink BWP in the frequency domain is non-contiguous in the frequency domain. Each RBW may be associated with a set of one or more operational constraints. The set of one or more operational constraints may include or correspond to the operational constraint 812. The multiple RBWs may include including one or more dormant RBWs, each of which the UE is not required to monitor for the physical downlink control channel, such as the PDCCH 882.

In block 1406, the UE monitors for a downlink signal in the first RBW. The downlink signal may include or correspond to the RS 880.

In some implementations, the UE receives a configuration for an uplink BWP. The configuration may be received in a configuration message, such as the configuration message 870. Additionally, or alternatively, the UE receives mode configuration information from a primary cell or a primary secondary cell. The mode configuration information may include or correspond to the mode information 815. The UE may configure the UE in a full-duplex mode, such as an in-band full-duplex mode or a sub-band full-duplex mode. The UE may be in the full-duplex mode during monitoring for the downlink signal in the first RBW.

In some implementations, each of the RBWs of the multiple RBWs is associated with a set of one or more operational constraints. The one or more operational constraints are associated with at least one of monitoring for one or more downlink reference signals, monitoring for a physical downlink control channel, monitoring for a physical downlink shared channel, measuring self-interference, measuring cluster reflection, or preforming a measurement associated with full-duplex operation. The downlink reference signals may include a CSI-RS.

In some implementations, the multiple RBWs include one or more non-dormant RBWs, in each of which the UE is configured to monitor for a physical downlink control channel. Based on the identified RBW being a dormant RBW, the UE may monitor for CSI-RS. Alternatively, based on the first RBW being a non-dormant RBW, the UE may monitor for a physical downlink shared channel.

In some implementations, after monitoring for a downlink signal in the first RBW, the UE may receive a switching message including DCI from a primary cell or a secondary primary cell. The primary cell or the secondary primary cell may be associated with the base station 105. The switching message may include or correspond to the switch message 874. The UE may identify a second RBW of the multiple RBWs based on the switching message. Additionally, or alternatively, the UE may switch the UE from operating according to a first set of one or more operational constraints associated with the first RBW to operating according to a second set of one or more operational constraints associated with the second RBW.

In some implementations, after monitoring for a downlink signal in the first RBW, the UE may identify that a time period has elapsed. Based on a determination that the time period has elapsed, the UE may identify a second RBW of the multiple RBWs based on RRC configuration criteria. The RRC configuration criteria may be associated with an RBW ID value, a previous active RBW, or a default RBW. The UE may switch from operating according to a first set of one or more operational constraints associated with the first RBW to operating according to a second set of one or more operational constraints associated with the second RBW based on the RRC configuration criteria. For example, the UE may switch to use of an RBW, other than a current RBW, with the lowest ID or with the largest ID. As another example, the UE may switch to use of the latest active RBW other than use of the current RBW. As another example, the UE may switch to use of a default RBW, such as an RBW configured by an RRC to be a default. In some implementations, if the default is the current RBW at the time of switching, the UE may alternatively switch to use of the RBW with the lowest ID, the RBW with the largest ID, or the latest active RBW.

In some implementations, the first RBW of the multiple RBWs is a first dormant RBW and the second RBW is a second dormant RBW. The first dormant RBW may be associated with a first portion of a bandwidth of the dormant downlink BWP, and the second dormant RBW may be associated with a second portion of the bandwidth of the dormant downlink BWP that is different than the first portion. Additionally, or alternatively, the first set of one or more operational constraints may be different than the second set of one or more operational constraints.

In some implementations, based on the first RBW being a non-dormant RBW, the UE monitors, while in the full-duplex mode, for the physical downlink control channel or a physical downlink shared channel in the non-dormant downlink RBW from the secondary cell. Additionally, or alternatively, the UE may switch from operating according to a first set of one or more operational constraints associated with the first RBW to operating according to a second set of one or more operational constraints associated with the second RBW. The second RBW may be a dormant RBW. In some implementations, the first RBW is a default non-dormant RBW, the second RBW is a default dormant RBW, or a combination thereof.

In some implementations, after monitoring for a downlink signal in the first RBW, the UE receives a switching message including DCI from a primary cell or a secondary primary cell. The switching message may include or correspond to the switch message 874. The UE may identify another downlink BWP based on the switching message. The other BWP may be another dormant downlink BWP or a non-dormant downlink BWP. The UE may switch from monitoring at least a portion of a first bandwidth the dormant downlink BWP to monitoring at least a portion of a second bandwidth of the other BWP.

FIG. 15 is a flow diagram illustrating an example process 1500 that supports a dormant BWP configuration that may be used for full-duplex operation for one of downlink or uplink communications according to some aspects. Operations of the process 1500 may be performed by a UE, such as the UE 115 described above with reference to FIGS. 1, 2, 3A, 3B, 3C, 8, or the UE 1600 described with reference to FIG. 16. For example, example operations (also referred to as "blocks") of the process 1500 may enable the UE 400 to support a dormant BWP.

In block 1502, the UE receives one or more configurations for a dormant downlink BWP. The one or more configuration may include or correspond to the BWP information 805. The dormant downlink BWP is associated with a secondary cell for which the UE is not required to monitor for a physical downlink control channel. The secondary cell may be associated with the base station 860.

In block 1504, the UE receives a first indication of a first RBW of multiple resource bandwidths RBWs capable of being configured in the dormant downlink BWP. Each RBW of the multiple RBWs spans at least a portion of the dormant downlink BWP in a frequency domain. Additionally, each RBW of the multiple RBWs is associated with a set of one or more operational constraints. The multiple RBWs include one or more dormant RBWs in each of which the UE is not required to monitor for the physical downlink control channel and include at least one uplink dormant RBW. The first RBW including one of a downlink dormant RBW of the multiple RBWs or an uplink dormant RBW of the multiple RBWs.

In block 1506, the UE performs one or more operations for the first RBW based on a first set of one or more operational constraints associated with the first RBW based on receiving the first indication. The first set of one or more operational constraints may include or correspond to the operational constraint 812.

In some implementations, the UE receives, from a primary cell or a secondary primary cell, a second indication of a second RBW of the multiple RBWs. The primary cell or the secondary primary cell may be associated with the base station 105. The second RBW includes the other of the downlink dormant RBW and the uplink dormant RBW. The second RBW may be associated with a second set of one or more operational constraints.

In some implementations, the UE uses a second set of one or more operational constraints associated with the second RBW based on the second indication. The first set of one or more operational constraints may be different from the second set of one or more operational constraints.

In some implementations, the UE determines the downlink dormant RBW is a default downlink dormant RBW based on the one or more configurations. Additionally, or alternatively, the UE determines the uplink dormant RBW is a default uplink dormant RBW based on the one or more configurations.

In some implementations, the UE may select the downlink dormant RBW for the UE based on the first indication. Additionally, performing the one or more operations for the first RBW based on the first set of one or more operational constraints comprises performing the one or more operations while operating in a full-duplex mode and operating in the downlink dormant RBW. To illustrate, the one or more operations may include receiving a downlink signal in the downlink dormant RBW, measuring the downlink reference signal for RRM, RLM, or a combination thereof.

In some implementations, the UE selects the uplink dormant RBW for the UE based on the first indication. Additionally, performing the one or more operations for the first RBW based on the first set of one or more operational constraints comprises performing the one or more operations while operating in a full-duplex mode. To illustrate, the one or more operations may include transmitting an uplink signal in the uplink dormant RBW. Additionally, while operating in a full-duplex mode and based on the first set of one or more operational constraints, the UE may determine self-interference at the UE. The self-interference may be associated with an amount of interference caused by an uplink signal transmitted by the UE on a downlink signal received by the UE. For example, one of the uplink signal is transmitted in the first RBW of the multiple RBWs or the downlink signal is received in the first RBW of the multiple RBWs. In some implementations, the dormant downlink RBW is associated with a first portion of a bandwidth of dormant downlink BWP and the dormant uplink RBW is associated with a second portion of the bandwidth that is different from the first portion of the bandwidth. Additionally, or alternatively, the first set of one or more operational constraints for the dormant downlink RBW may be different than the second set of one or more operational constraints for the dormant uplink RBW.

As described with reference to FIGS. 13-15, the present disclosure provides techniques for use of a dormant BWP. In some implementations, the dormant BWP may include multiple RBWs having at least one dormant RBW which is associated with a set of one or more operational constraints that the UE 115 may perform. The different operational constraints of different RBWs may provide system and device flexibility and customization. Additionally, switching a configuration between use of the different RBWs of a BWP may be performed faster than switching between use of different BWPs. Accordingly, the use of a dormant BWP, that includes multiple RBWs, may improve an operational efficiency of the UE and reduce service delays and interruptions.

FIG. 16 is a block diagram of an example UE 1600 that supports a dormant BWP configuration that may be used for full-duplex operation for downlink communications according to some aspects. The UE 1600 may be configured to perform operations, including the blocks of a process described with reference to FIGS. 13-15, to use a dormant BWP. In some implementations, the UE 1600 includes the structure, hardware, and components shown and described with reference to the UE 115 of FIG. 2 or 8. For example, the UE 1600 includes the controller 280, which operates to execute logic or computer instructions stored in the memory 282, as well as controlling the components of the UE 1600 that provide the features and functionality of the UE 1600. The UE 1600, under control of the controller 280, transmits and receives signals via wireless radios 1601a-r and the antennas 252a-r. The wireless radios 1601a-r include various components and hardware, as illustrated in FIG. 2 for the UE 115, including the modulator and demodulators 254a-r, the MIMO detector 256, the receive processor 258, the transmit processor 264, and the TX MIMO processor 266.

Figure 18:
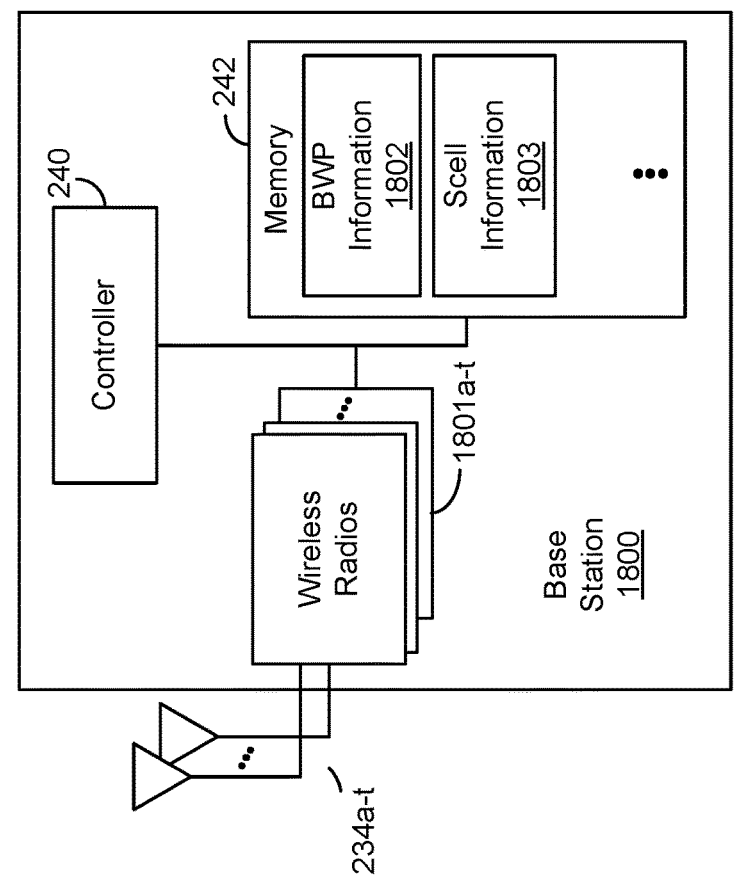
FIG. 18 is a block diagram of an example base station that supports a dormant BWP configuration that may be used for full-duplex operation for downlink communications according to some aspects.

As shown, the memory 282 may include BWP information 1602, channel quality information 1603, mode information 1604, and timer logic 1605. The BWP information 1602, the channel quality information 1603, and the mode information 1604 may include or correspond to the BWP information 805, the channel quality information 814, and the mode information 815. The timer logic 1605 may include or correspond to the timer. The UE 1600 may receive signals from or transmit signals to one or more network entities, such as the base station 105 of FIGS. 1, 2, 3A, 3B, 3C, and 8 or a base station as illustrated in FIG. 18.

Figure 17:
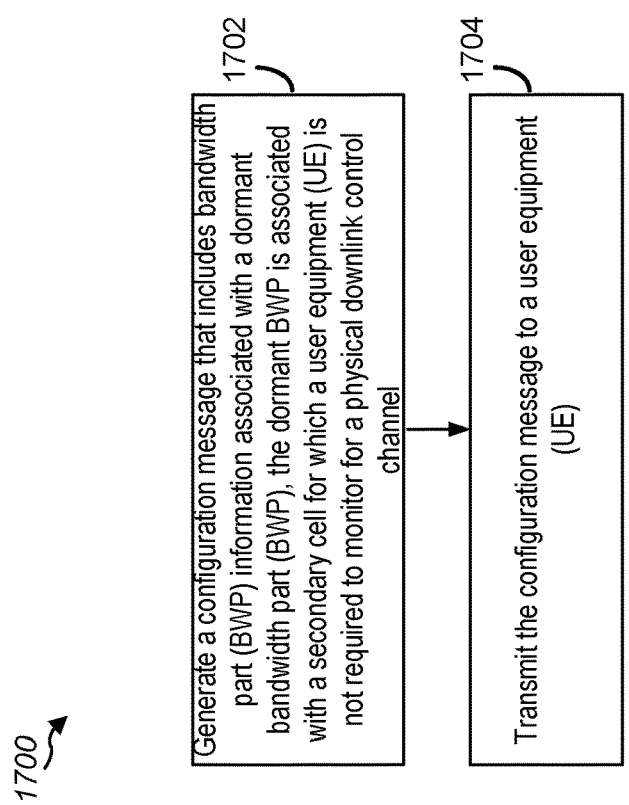
FIG. 17 is a flow diagram illustrating an example process that supports a dormant BWP configuration that may be used for full-duplex operation for downlink communications according to some aspects.

FIG. 17 is a flow diagram illustrating an example process 1700 that supports a dormant BWP configuration that may be used for full-duplex operation for downlink communications according to some aspects. Operations of the process 1700 may be performed by a base station, such as the base station 105 described above with reference to FIGS. 1-4, 8 or a base station as described above with reference to FIG. 18. For example, example operations of the process 1700 may enable the base station 105 to support a dormant BWP.

In block 1702, the base station generates a configuration message that includes BWP information associated with a dormant BWP. The BWP information may include or correspond to the BWP information 805. The configuration message may include or correspond to the configuration message 870. The dormant BWP is associated with a secondary cell for which a UE is not required to monitor for a physical downlink control channel. The secondary cell may be associated with the base station 860.

In block 1704, the base station ttransmits the configuration message to the UE. For example, the configuration message may include or correspond to the configuration message 870.

In some implementations, after transmitting the configuration message, the base station transmits a first switch message to the UE. The first switching message may include or correspond to the switch message 874. The first switch message may be configured to cause the UE to switch from use of the dormant BWP to use of another BWP, such as a non-dormant BWP. For example, the first switch message may be configured to cause the UE 115 to switch from use of the first BWP 806 to use of the second BWP 813.

In some implementations, the dormant BWP includes multiple RBWs. The multiple RBWs may include or correspond to the dormant RBW 808, the non-dormant RBW 810, or a combination thereof. In some implementations, the multiple RBWs including a first dormant RBW that includes a subset of a frequency band of the dormant BWP. For example, the dormant BWP may include or correspond to the dormant RBW 808. The dormant RBW may be associated with one or more operational constraints, such as the operational constraint 812. The one or more operational constraints associated with the first dormant RBW may be different than one or more operational constraints associated with another dormant RBW of the multiple RBWs.

In some implementations, after transmitting the configuration message, the base station may transmit a second switch message to the UE. The second switch message may include or correspond to the switch message 874. The second switch message may be configured to cause the UE to switch from use of the dormant RBW to use of another RBW of the multiple RBWs. The other RBW may include another dormant RBW or a non-dormant RBW.

In some implementations, the multiple RBWs further include a non-dormant RBW. For example, the non-dormant RBW may include or correspond to the non-dormant RBW 810. Additionally, or alternatively, the dormant RBW may be a default dormant RBW, the non-dormant RBW may be a default non-dormant RBW, the second switch message may include DCI, or a combination thereof.

In some implementations, the base station may transmit DCI or an RRC message that indicates a duration of a time period associated with the UE switching from use of the dormant RBW to use of another RBW, such as the non-dormant RBW. The DCI or the RRC message may include or correspond to the configuration message 870 or the control message 872.

In some implementations, the multiple RBWs include a downlink dormant RBW, an uplink dormant RBW, or a combination thereof. For example, the downlink dormant RBW and the uplink dormant RBW may include or correspond to the DL dormant RBW 1151 and the UL dormant RBW 1152, respectively. In some implementations, the multiple RBWs may include one or more default RBWs. To illustrate, the downlink dormant RBW may be a default downlink dormant RBW, the uplink dormant RBW may be a default uplink dormant RBW, or a combination thereof.

In some implementations, the BWP information is associated with a first BWP and a second BWP. The first BWP and the second BWP may include or correspond to the first BWP 806 and the second BWP 813, respectively. The first BWP may include the dormant BWP. In some implementations, the second BWP includes a second dormant RBW. To illustrate, the first BWP and the second BWP may include or correspond to the first BWP 1210 including a first dormant RBW 1211 and the second BWP 1220 including a second dormant RBW 1222.

FIG. 18 is a block diagram of an example base station 1800 that supports a dormant BWP configuration that may be used for full-duplex operation for downlink communications according to some aspects. The base station 1800 may be configured to perform operations, including the blocks of the process 1700 described with reference to FIG. 17, to support a dormant BWP. In some implementations, the base station 1800 includes the structure, hardware, and components shown and described with reference to the base station 105 of FIGS. 1-4, and 8. For example, the base station 1800 may include the controller 240, which operates to execute logic or computer instructions stored in the memory 242, as well as controlling the components of the base station 1800 that provide the features and functionality of the base station 1800. The base station 1800, under control of the controller 240, transmits and receives signals via wireless radios 1801a-t and the antennas 234a-t. The wireless radios 1801a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include BWP information 1802 and Scell information 1803. The BWP information 1802 may include or correspond to the BWP information 805. The Scell information 1803 may include or correspond to an ID or a state of a base station or Scell, such as the base station 860. The base station 1800 may receive signals from or transmit signals to one or more UEs, such as the UE 115 of FIGS. 1, 2, 3A, 3B, 3C, and 8 or the UE 1600 of FIG. 16.

It is noted that one or more blocks (or operations) described with reference to FIGS. 13-15 and 17 may be combined with one or more blocks (or operations) described with reference to another of the figures. For example, one or more blocks (or operations) of FIG. 13-15 may be combined with one or more blocks (or operations) of FIG. 17. As another example, one or more blocks associated with FIG. 13 may be combined with one or more blocks associated with FIG. 14 or 15. As another example, one or more blocks associated with FIG. 13-15 or 17 may be combined with one or more blocks (or operations) associated with FIG. 1, 2, 3A, 3B, 3C or 8. Additionally, or alternatively, one or more operations described above with reference to FIG. 1, 2, 3A, 3B, 3C or 8 may be combined with one or more operations described with reference to FIG. 14 or 16.

In some aspects, techniques for supporting a dormant BWP configuration that may be used for full-duplex operation for downlink communications may include additional aspects, such as any single aspect or any combination of aspects described below or in connection with one or more other processes or devices described elsewhere herein. In a first aspect, techniques for supporting a dormant BWP configuration may include receiving one or more configurations for a dormant downlink BWP and an uplink BWP, the dormant downlink BWP being associated with a secondary cell for which it is not required to monitor for a physical downlink control channel; while in a full-duplex mode, receiving a downlink signal in the dormant downlink BWP in one or more symbols; and transmitting of an uplink signal in the uplink BWP in at least one symbol of the one or more symbols. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the uplink BWP is associated with the secondary cell, the downlink signal includes a RS, the uplink signal includes a SRS, or a combination thereof.

In a third aspect, in combination with one or more of the first aspect or the second aspect, the techniques further include receiving mode configuration information from a primary cell or a primary secondary cell.

In a fourth aspect, in combination with one or more of the first aspect through the third aspect, the techniques further include configuring for the full-duplex mode. The full-duplex mode may include an in-band full-duplex mode or a sub-band full-duplex mode.

In a fifth aspect, in combination with one or more of the first aspect through the fourth aspect, the techniques further include determining self-interference. The self-interference may be associated with an amount of interference caused by the transmitted uplink signal on the received downlink signal.

In a sixth aspect, in combination with one or more of the first aspect through the fifth aspect, the techniques further include configuring for the dormant downlink BWP based on the secondary cell being in a dormant state.

In a seventh aspect, in combination with one or more of the first aspect through the sixth aspect, the downlink signal is received from the secondary cell while the secondary cell is in an in-band full-duplex mode or a sub-band full-duplex mode. The sub-band full-duplex mode is associated with a configuration including one or more downlink resources and one or more uplink resources, the one or more downlink resources being within a first bandwidth of a band and the one or more uplink resources being within a second bandwidth of the band that is separated in a frequency domain from the first bandwidth by a guard region. The in-band full-duplex mode is associated with a configuration of one or more downlink resource and one or more uplink resources, the one or more downlink resources being within a first bandwidth of a band and the one or more uplink resources being within a second bandwidth of the band that at least partially overlaps the first bandwidth in the frequency domain.

In an eighth aspect, in combination with one or more of the first aspect through the seventh aspects to receive the one or more configurations, the techniques further include receiving an RRC message from a primary cell or a primary secondary cell. The RRC message may indicate at least one of the one or more configurations.

In a ninth aspect, in combination with one or more of the first aspect through the eighth aspect, the one or more configurations define multiple RBWs of the dormant downlink BWP. The multiple RBWs may include a first RBW that is a first dormant RBW and a second RBW that is a second dormant RBW or a non-dormant RBW.

In a tenth aspect, in combination with one or more of the first aspect through the ninth aspect, the techniques further include, after receiving the one or more configurations, receiving, from a primary cell or a primary secondary cell, one or more control messages including DCI.

In an eleventh aspect, in combination with one or more of the first aspect through the tenth aspect, the techniques further include configuring for the dormant downlink BWP and the uplink BWP based on the one or more control messages.

In a twelfth aspect, in combination with one or more of the first aspect through the eleventh aspect, the techniques further include, after receiving the downlink signal and transmitting the uplink signal, receiving a switching message including DCI, and identifying a non-dormant downlink BWP based on the switching message.

In a thirteenth aspect, in combination with one or more of the first aspect through the twelfth aspect, the techniques further include switching from using the dormant downlink BWP to using the non-dormant downlink BWP, and monitoring, while in the full-duplex mode, for a physical downlink control channel or a physical downlink shared channel in the non-dormant downlink BWP from the secondary cell.

In a fourteenth aspect, in combination with one or more of the first aspect through the thirteenth aspect, the techniques further include, after switching to the non-dormant downlink BWP, transmitting, while in the full-duplex mode, a physical uplink control channel or a physical uplink shared channel in the uplink BWP to the secondary cell while the secondary cell is in an activated, non-dormant state.

In a fifteenth aspect, in combination with one or more of the first aspect through the fourteenth aspect, the techniques further include receiving an indication of a first resource bandwidth (RBW) of multiple RBWs capable of being configured in the dormant downlink BWP, each RBW of the multiple RBWs spanning at least a portion of the dormant downlink BWP in a frequency domain, each RBW being associated with a set of one or more operational constraints, the multiple RBWs including one or more dormant RBWs, in each of which it is not required to monitor for a physical downlink control channel.

In a sixteenth aspect, in combination with the fifteenth aspect, the techniques further include monitoring for a downlink signal in the first RBW.

In a seventeenth aspect, in combination with the fifteenth aspect, the techniques further include, after monitoring for the downlink signal in the first RBW, receiving a switching message including DCI from a primary cell or a secondary primary cell.

In an eighteenth aspect, in combination with the seventeenth aspect, the techniques further include identifying a second RBW of the multiple RBWs based on the switching message.

In a nineteenth aspect, in combination with the eighteenth aspect, the techniques further include switching from operating according to a first set of one or more operational constraints associated with the first RBW to operating according to a second set of one or more operational constraints associated with the second RBW.

In a twentieth aspect, in combination with the nineteenth aspect, the portion of the dormant downlink BWP associated with the first RBW includes at least two non-contiguous portions in the frequency domain.

In a twenty-first aspect, in combination with one or more of the nineteenth aspect or the twentieth aspect, the one or more operational constraints are associated with at least one of: monitoring for one or more downlink reference signals, wherein the downlink reference signals include a CSI-RS; monitoring for a physical downlink control channel; monitoring for a physical downlink shared channel; measuring self-interference; measuring cluster reflection; or preforming a measurement associated with full-duplex operation.

In a twenty-second aspect, in combination with the fifteenth aspect, the techniques further include, after monitoring for the downlink signal in the first RBW, receiving a switching message including DCI from a primary cell or a secondary primary cell In a twenty-third aspect, in combination with the twenty-second aspect, the techniques further include identifying another downlink BWP based on the switching message, the other BWP being a second dormant downlink BWP or a non-dormant downlink BWP.

In a twenty-fourth aspect, in combination with the twenty-third aspect, the techniques further include switching from monitoring at least a portion of a first bandwidth of the dormant downlink BWP to monitoring at least a portion of a second bandwidth of the other BWP.

In a twenty-fifth aspect, in combination with the fifteenth aspect the multiple RBWs include at least one uplink dormant RBW, and the RBW includes one of a downlink dormant RBW of the multiple RBWs or an uplink dormant RBW of the multiple RBWs.

In a twenty-sixth aspect, in combination with the twenty-fifth aspect, the techniques further include performing one or more operations for the first RBW based on a first set of one or more operational constraints associated with the first RBW based on receiving the first indication.

In some aspects, techniques for supporting a dormant BWP configuration that may be used for full-duplex operation for downlink communications may include additional aspects, such as any single aspect or any combination of aspects described below or in connection with one or more other processes or devices described elsewhere herein. In a twenty-seventh aspect, techniques for supporting a dormant BWP configuration may include receiving one or more configurations for a dormant downlink BWP. The dormant downlink BWP is associated with a secondary cell for which it is not required to monitor for a physical downlink control channel. The techniques also include receiving an indication of a first RBW of multiple RBWs capable of being configured in the dormant downlink BWP. Each RBW of the multiple RBWs spans at least a portion of the dormant downlink BWP in a frequency domain. Each RBW is associated with a set of one or more operational constraints. The multiple RBWs includes one or more dormant RBWs, in each of which it is not required to monitor for a physical downlink control channel. The techniques further include monitoring for a downlink signal in the first RBW In some examples, the techniques in the twenty-seventh aspect may be implemented in a method or process. In some other examples, the techniques of the twenty-seventh aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a twenty-eighth aspect, in combination with the twenty-seventh aspect, the portion of the dormant downlink BWP associated with the first RBW includes at least two non-contiguous portions in the frequency domain.

In a twenty-ninth aspect, in combination with one or more of the twenty-seventh aspect or the twenty-eighth aspect, the techniques further include receiving a configuration for an uplink bandwidth part, and receiving mode configuration information from a primary cell or a primary secondary cell.

In a thirtieth aspect, in combination with one or more of the twenty-seventh aspect through the twenty-ninth aspect, the techniques further include configuring a full-duplex mode. The full-duplex mode may include an in-band full-duplex mode or a sub-band full-duplex mode. The full-duplex mode may be used during the monitoring for the downlink signal in the first RBW.

In a thirty-first aspect, in combination with one or more of the twenty-seventh aspect through the thirtieth aspect, the techniques further include receiving the one or more configurations, and receiving an RRC message from a primary cell or a primary secondary cell. The RRC message may indicate the one or more configurations.

In a thirty-second aspect, in combination with one or more of the twenty-seventh aspect through the thirty-first aspect, the one or more operational constraints are associated with at least one of: monitoring for one or more downlink reference signals, the downlink reference signals may include a CSI-RS; monitoring for a physical downlink control channel; monitoring for a physical downlink shared channel; measuring self-interference; measuring cluster reflection; or preforming a measurement associated with full-duplex operation.

In a thirty-third aspect, in combination with the thirty-second aspect, the multiple RBWs include one or more non-dormant RBWs, in each of which it is configured to monitor for a physical downlink control channel.

In a thirty-fourth aspect, in combination with the thirty-second aspect, the first RBW is a dormant RBW and the techniques further include monitoring for the downlink signal, monitoring for a CSI-RS based on the first RBW being a dormant RBW, or a combination thereof.

In a thirty-fifth aspect, in combination with the thirty-second aspect, the first RBW is a non-dormant RBW and the techniques further include monitoring for the downlink signal, monitoring for a physical downlink shared channel based on the first RBW being a non-dormant RBW, or a combination thereof.

In a thirty-sixth aspect, in combination with one or more of the twenty-seventh aspect through the thirty-fifth aspect, the techniques further include, after monitoring for the downlink signal in the first RBW, receiving a switching message including DCI from a primary cell or a secondary primary cell.

In a thirty-seventh aspect, in combination with the thirty-sixth aspect, the techniques further include identify a second RBW of the multiple RBWs based on the switching message. The techniques may further include switching from operating according to a first set of one or more operational constraints associated with the first RBW to operating according to a second set of one or more operational constraints associated with the second RBW.

In a thirty-eighth aspect, in combination with one or more of the twenty-seventh aspect through the thirty-fifth aspect, the techniques further include, after monitoring for the downlink signal in the first RBW, determining that a time period has elapsed.

In a thirty-ninth aspect, in combination with the thirty-eighth aspect, the techniques further include, based on the determination that the time period has elapsed, identifying a second RBW of the multiple RBWs based on RRC configuration criteria. The RRC configuration criteria may be associated with an RBW ID value, a previously active RBW, or a default RBW.

In a fortieth aspect, in combination with the thirty-ninth aspect, the techniques further include switching from operating according to a first set of one or more operational constraints associated with the first RBW to operating according to a second set of one or more operational constraints associated with the second RBW based on the RRC configuration criteria.

In a forty-first aspect, in combination with the fortieth aspect, the first RBW is a first dormant RBW and the second RBW is a second dormant RBW.

In a forty-second aspect, in combination with the forty-first aspect, the first dormant RBW is associated with a first portion of a bandwidth of the dormant downlink BWP. In some implementations, the second dormant RBW is associated with a second portion of the bandwidth of the dormant downlink BWP that is different than the first portion, the first set of one or more operational constraints is different than the second set of one or more operational constraints, or a combination thereof.

In a forty-third aspect, in combination with one or more of the twenty-seventh aspect through thirty-first aspect, the techniques further include, based on the first RBW being a non-dormant RBW, monitoring, while in the full-duplex mode, for the physical downlink control channel or a physical downlink shared channel in the non-dormant RBW from the secondary cell.

In a forty-forth aspect, in combination with the forty-third aspect, the techniques further include switching from operating according to a first set of one or more operational constraints associated with the first RBW to operating according to a second set of one or more operational constraints associated with the second RBW. The second RBW may a dormant RBW. In some implementations, the first RBW is a default non-dormant RBW, the second RBW is a default dormant RBW, or a combination thereof.

In a forty-fifth aspect, in combination with one or more of the twenty-seventh aspect the thirty-first aspect, the techniques further include, after monitoring for the downlink signal in the first RBW, receiving a switching message including DCI from a primary cell or a secondary primary cell.

In a forty-sixth aspect, in combination with the forty-fifth aspect, the techniques further include identifying another downlink BWP based on the switching message, and switching from monitoring at least a portion of a first bandwidth of the dormant downlink BWP to monitoring at least a portion of a second bandwidth of the other BWP. The other BWP may be a second dormant downlink BWP or a non-dormant downlink BWP.

In a forty-seventh aspect, in combination with the twenty-seventh aspect, the multiple RBWs include at least one uplink dormant RBW, and the RBW includes one of a downlink dormant RBW of the multiple RBWs or an uplink dormant RBW of the multiple RBWs.

In a forty-eighth aspect, in combination with the forty-seventh aspect, the techniques further include performing one or more operations for the first RBW based on a first set of one or more operational constraints associated with the first RBW based on receiving the first indication.

In some aspects, techniques for supporting a dormant BWP configuration that may be used for full-duplex operation for downlink communications may include additional aspects, such as any single aspect or any combination of aspects described below or in connection with one or more other processes or devices described elsewhere herein. In a forty-ninth aspect, techniques for supporting a dormant BWP configuration may include receive one or more configurations for a dormant downlink BWP. The dormant downlink BWP being associated with a secondary cell for which it is not required to monitor for a physical downlink control channel. The techniques also include receiving a first indication of a first RBW of multiple RBWs capable of being configured in the dormant downlink BWP. Each RBW of the multiple RBWs spans at least a portion of the dormant downlink BWP in a frequency domain. Each RBW of the multiple RBWs is associated with a set of one or more operational constraints. The multiple RBWs includes one or more dormant RBWs in each of which it is not required to monitor for the physical downlink control channel and including at least one uplink dormant RBW. The first RBW includes one of a downlink dormant RBW of the multiple RBWs or an uplink dormant RBW of the multiple RBWs. The techniques further include performing one or more operations for the first RBW based on a first set of one or more operational constraints associated with the first RBW based receiving on the first indication. In some examples, the techniques in the forty-ninth aspect may be implemented in a method or process. In some other examples, the techniques of the forty-ninth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a fiftieth aspect, in combination with the forty-ninth aspect, the techniques further include receiving, from a primary cell or a secondary primary cell, a second indication of a second RBW of the multiple RBWs. The second RBW may include the other of the downlink dormant RBW and the uplink dormant RBW. The second RBW may be associated with a second set of one or more operational constraints.

In a fifty-first aspect, in combination with one or more of the forty-ninth aspect or the fiftieth aspect, the techniques further include performing one or more operations for the second RBW based on the second set of one or more operational constraints based on receiving the second indication.

In a fifty-second aspect, in combination with one or more of the forty-ninth aspect or the fiftieth aspect, the techniques further include determining the downlink dormant RBW is a default downlink dormant RBW based on the one or more configurations, determining the uplink dormant RBW is a default uplink dormant RBW based on the one or more configurations, or a combination thereof.

In a fifty-third aspect, in combination with one or more of the forty-ninth aspect through the fifty-second aspect, the techniques further include selecting the downlink dormant RBW based on the first indication. To perform the one or more operations for the first RBW based on the first set of one or more operational constraints, the techniques may include performing the one or more operations while operating in a full-duplex mode and operating in the downlink dormant RBW.

In a fifty-fourth aspect, in combination with one or more of the forty-ninth aspect through the fifty-third aspect, to perform the one or more operations, the techniques further include receiving a downlink signal in the downlink dormant RBW, and measuring the downlink reference signal for RRM or RLM.

In a fifty-fifth aspect, in combination with one or more of the forty-ninth aspect through the fifty-fourth aspect, the techniques further include selecting the uplink dormant RBW based on the first indication. Performing the one or more operations for the first RBW based on the first set of one or more operational constraints may include performing the one or more operations while operating in a full-duplex mode, where the performing includes receiving an uplink signal in the uplink dormant RBW.

In a fifty-sixth aspect, in combination with one or more of the forty-ninth aspect through the fifty-fifth aspect, the techniques further include determining, while operating in a full-duplex mode based on the first set of one or more operational constraints, self-interference. The self-interference may be associated with an amount of interference caused by a transmitted uplink signal on a received downlink signal. One of the uplink signal is transmitted in the first RBW of the multiple RBWs or the downlink signal is received in the first RBW of the multiple RBWs.

In a fifty-seventh aspect, in combination with one or more of the forty-ninth aspect through the fifty-sixth aspect, the dormant downlink RBW is associated with a first portion of a bandwidth of the dormant downlink BWP. In some implementations, the dormant uplink RBW is associated with a second portion of the bandwidth that is different from the first portion of the bandwidth, the first set of one or more operational constraints for the dormant downlink RBW is different than the second set of one or more operational constraints for the dormant uplink RBW, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-16 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving one or more configurations for a dormant downlink bandwidth part (BWP) and an uplink BWP, the dormant downlink BWP being associated with a secondary cell for which the UE is not required to monitor for a physical downlink control channel;
   receiving, while in a full-duplex mode, a downlink signal in the dormant downlink BWP in one or more symbols; and
   transmitting, while in the full-duplex mode, an uplink signal in the uplink BWP in at least one symbol of the one or more symbols.

2. The method of claim 1, wherein:
   the uplink BWP is associated with the secondary cell;
   the downlink signal includes a reference signal (RS);
   the uplink signal includes a sounding reference signal (SRS); or
   a combination thereof.

3. The method of claim 1, further comprising:
   receiving mode configuration information from a primary cell or a primary secondary cell; and
   configuring the UE in the full-duplex mode, wherein the full-duplex mode includes an in-band full-duplex mode or a sub-band full-duplex mode.

4. The method of claim 1, further comprising determining self-interference of the UE, the self-interference associated with an amount of interference caused by the uplink signal transmitted by the UE on the downlink signal received by the UE, wherein the UE is configured for the dormant downlink BWP based on the secondary cell being in a dormant state.

5. The method of claim 1, wherein the downlink signal is received from the secondary cell while the secondary cell is in an in-band full-duplex mode or a sub-band full-duplex mode, and wherein:
   the sub-band full-duplex mode is associated with a configuration including one or more downlink resources and one or more uplink resources, the one or more downlink resources being within a first bandwidth of a band and the one or more uplink resources being within a second bandwidth of the band that is separated in a frequency domain from the first bandwidth by a guard region; and
   the in-band full-duplex mode is associated with a configuration of one or more downlink resource and one or more uplink resources, the one or more downlink resources being within a first bandwidth of a band and the one or more uplink resources being within a second bandwidth of the band that at least partially overlaps the first bandwidth in the frequency domain.

6. The method of claim 1, wherein receiving the one or more configurations includes receiving a radio resource control (RRC) message from a primary cell or a primary secondary cell, the RRC message indicating at least one of the one or more configurations.

7. The method of claim 1, wherein the one or more configurations define multiple resource bandwidths (RBWs) of the dormant downlink BWP, the multiple RBWs including a first RBW that is a first dormant RBW and a second RBW that is a second dormant RBW or a non-dormant RBW.

8. The method of claim 1, further comprising:
after receiving the one or more configurations, receiving, from a primary cell or a primary secondary cell, one or more control messages including downlink control information (DCI); and
configuring the UE for the dormant downlink BWP and the uplink BWP based on the one or more control messages.

9. The method of claim 1, further comprising:
after receiving the downlink signal and transmitting the uplink signal, receiving a switching message including downlink control information (DCI);
identifying a non-dormant downlink BWP based on the switching message;
switching the UE from using the dormant downlink BWP to using the non-dormant downlink BWP; and
monitoring, while in the full-duplex mode, for a physical downlink control channel or a physical downlink shared channel in the non-dormant downlink BWP from the secondary cell.

10. The method of claim 9, further comprising, after switching the UE to the non-dormant downlink BWP, transmitting, while in the full-duplex mode, a physical uplink control channel or a physical uplink shared channel in the uplink BWP to the secondary cell while the secondary cell is in an activated, non-dormant state.

11. The method of claim 1, further comprising:
receiving an indication of a first resource bandwidth (RBW) of multiple RBWs capable of being configured in the dormant downlink BWP, each RBW of the multiple RBWs spanning at least a portion of the dormant downlink BWP in a frequency domain, each RBW being associated with a set of one or more operational constraints, the multiple RBWs including one or more dormant RBWs, in each of which the UE is not required to monitor for a physical downlink control channel; and
monitoring for a downlink signal in the first RBW.

12. The method of claim 11, further comprising:
after monitoring for the downlink signal in the first RBW, receiving a switching message including downlink control information (DCI) from a primary cell or a secondary primary cell;
identifying a second RBW of the multiple RBWs based on the switching message; and
switching the UE from operating according to a first set of one or more operational constraints associated with the first RBW to operating according to a second set of one or more operational constraints associated with the second RBW,
wherein the portion of the dormant downlink BWP associated with the first RBW includes at least two non-contiguous portions in the frequency domain; and
wherein the one or more operational constraints are associated with at least one of:
monitoring for one or more downlink reference signals, wherein the downlink reference signals include a channel state information (CSI) reference signal (CSI-RS);
monitoring for a physical downlink control channel;
monitoring for a physical downlink shared channel;
measuring self-interference;
measuring cluster reflection; or
preforming a measurement associated with full-duplex operation.

13. The method of claim 11, further comprising:
after monitoring for the downlink signal in the first RBW, receiving a switching message including downlink control information (DCI) from a primary cell or a secondary primary cell;
identifying another downlink BWP based on the switching message, the other BWP being a second dormant downlink BWP or a non-dormant downlink BWP; and
switching the UE from monitoring at least a portion of a first bandwidth of the dormant downlink BWP to monitoring at least a portion of a second bandwidth of the other BWP.

14. The method of claim 11, wherein the multiple RBWs include at least one uplink dormant RBW, and the RBW includes one of a downlink dormant RBW of the multiple RBWs or an uplink dormant RBW of the multiple RBWs, and
further comprising performing one or more operations for the first RBW based on a first set of one or more operational constraints associated with the first RBW based on receiving the indication.

15. The method of claim 1, wherein:
the downlink signal is received from the secondary cell while the secondary cell is in a sub-band full-duplex mode, and
the sub-band full-duplex mode is associated with a configuration including one or more downlink resources and one or more uplink resources, the one or more downlink resources being within a first bandwidth of a band and the one or more uplink resources being within a second bandwidth of the band that is separated in a frequency domain from the first bandwidth by a guard region.

16. The method of claim 1, wherein:
the downlink signal is received from the secondary cell while the secondary cell is in an in-band full-duplex mode, and
the in-band full-duplex mode is associated with a configuration of one or more downlink resource and one or more uplink resources, the one or more downlink resources being within a first bandwidth of a band and the one or more uplink resources being within a second bandwidth of the band that at least partially overlaps the first bandwidth in a frequency domain.

17. A user equipment (UE) comprising:
at least one processor; and
a memory coupled with the at least one processor and storing processor-readable code that, when executed by the at least one processor, is configured to:
receive one or more configurations for a dormant downlink bandwidth part (BWP) and an uplink BWP, the dormant downlink BWP being associated with a secondary cell for which the UE is not required to monitor for a physical downlink control channel;
receive, while in a full-duplex mode, a downlink signal in the dormant downlink BWP in one or more symbols; and
initiate, while in the full-duplex mode, transmission of an uplink signal in the uplink BWP in at least one symbol of the one or more symbols.

18. The UE of claim 17, wherein:
the uplink BWP is associated with the secondary cell;
the downlink signal includes a reference signal (RS);
the uplink signal includes a sounding reference signal (SRS); or
a combination thereof.

19. The UE of claim 17, wherein the processor-readable code, when executed by the at least one processor, is further configured to:
receive mode configuration information from a primary cell or a primary secondary cell; and
configure the UE in the full-duplex mode, wherein the full-duplex mode includes a sub-band full-duplex mode.

20. The UE of claim 17, wherein the processor-readable code, when executed by the at least one processor, is further configured to determine self-interference of the UE, the self-interference associated with an amount of interference caused by the uplink signal transmitted by the UE on the downlink signal received by the UE, wherein the UE is configured for the dormant downlink BWP based on the secondary cell being in a dormant state.

21. The UE of claim 17, wherein the downlink signal is received from the secondary cell while the secondary cell is in an in-band full-duplex mode or a sub-band full-duplex mode, and wherein:
the sub-band full-duplex mode is associated with a configuration including one or more downlink resources and one or more uplink resources, the one or more downlink resources being within a first bandwidth of a band and the one or more uplink resources being within a second bandwidth of the band that is separated in a frequency domain from the first bandwidth by a guard region; and
the in-band full-duplex mode is associated with a configuration of one or more downlink resource and one or more uplink resources, the one or more downlink resources being within a first bandwidth of a band and the one or more uplink resources being within a second bandwidth of the band that at least partially overlaps the first bandwidth in the frequency domain.

22. The UE of claim 17, wherein, to receive the one or more configurations, the processor-readable code, when executed by the at least one processor, is further configured to receive a radio resource control (RRC) message from a primary cell or a primary secondary cell, the RRC message is configured to indicate at least one of the one or more configurations.

23. The UE of claim 17, wherein the one or more configurations define multiple resource bandwidths (RBWs) of the dormant downlink BWP, the multiple RBWs including a first RBW that is a first dormant RBW and a second RBW that is a second dormant RBW or a non-dormant RBW.

24. The UE of claim 17, wherein the processor-readable code, when executed by the at least one processor, is further configured to:
after receipt of the one or more configurations, receive, from a primary cell or a primary secondary cell, one or more control messages including downlink control information (DCI); and
configure the UE for the dormant downlink BWP and the uplink BWP based on the one or more control messages.

25. The UE of claim 17, wherein the processor-readable code, when executed by the at least one processor, is further configured to:
after receipt of the downlink signal and transmission of the uplink signal, receive a switching message including downlink control information (DCI);
based on the switching message, switch the UE from using the dormant downlink BWP to using a non-dormant downlink BWP; and
monitoring, while in the full-duplex mode, for a physical downlink control channel or a physical downlink shared channel in the non-dormant downlink BWP from the secondary cell.

26. The UE of claim 25, wherein the processor-readable code, when executed by the at least one processor, is further configured to, after switching the UE to the non-dormant downlink BWP, initiate transmission, while in the full-duplex mode, of a physical uplink control channel or a physical uplink shared channel in the uplink BWP to the secondary cell while the secondary cell is in an activated, non-dormant state.

27. The UE of claim 17, wherein the processor-readable code, when executed by the at least one processor, is further configured to:
receive an indication of a first resource bandwidth (RBW) of multiple RBWs capable of being configured in the dormant downlink BWP, each RBW of the multiple RBWs spanning at least a portion of the dormant downlink BWP in a frequency domain, each RBW being associated with a set of one or more operational constraints, the multiple RBWs including one or more dormant RBWs, in each of which the UE is not required to monitor for a physical downlink control channel; and
monitor for a downlink signal in the first RBW.

28. The UE of claim 27, wherein the processor-readable code, when executed by the at least one processor, is further configured to:
after monitoring for the downlink signal in the first RBW, receive a switching message including downlink control information (DCI) from a primary cell or a secondary primary cell; and
switch the UE from operating according to a first set of one or more operational constraints associated with the first RBW to operating according to a second set of one or more operational constraints associated with a second RBW of the multiple RBWs based on the switching message.

29. The UE of claim 27, wherein the processor-readable code, when executed by the at least one processor, is further configured to:
after monitoring for the downlink signal in the first RBW, receive a switching message including downlink control information (DCI) from a primary cell or a secondary primary cell; and
switch the UE from monitoring at least a portion of a first bandwidth of the dormant downlink BWP to monitoring at least a portion of a second bandwidth of another downlink BWP based on the switching message, the other BWP being a second dormant downlink BWP or a non-dormant downlink BWP.

30. The UE of claim 27, wherein:
the multiple RBWs include at least one uplink dormant RBW;
the RBW includes one of a downlink dormant RBW of the multiple RBWs or an uplink dormant RBW of the multiple RBWs; and
the processor-readable code, when executed by the at least one processor, is further configured to perform one or more operations for the first RBW based on a first set of one or more operational constraints associated with the first RBW based on receiving the indication.

* * * * *